(12) United States Patent
Bursell

(10) Patent No.: US 12,093,371 B2
(45) Date of Patent: **\*Sep. 17, 2024**

(54) DATA DISTRIBUTION USING A TRUSTED EXECUTION ENVIRONMENT IN AN UNTRUSTED DEVICE

(71) Applicant: Red Hat, Inc., Raleigh, NC (US)

(72) Inventor: Michael Hingston McLaughlin Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 1024 days.

This patent is subject to a terminal disclaimer.

(21) Appl. No.: 16/885,786

(22) Filed: May 28, 2020

(65) Prior Publication Data

US 2021/0374232 A1 Dec. 2, 2021

(51) Int. Cl.
*G06F 21/53* (2013.01)
*G06F 9/455* (2018.01)
(Continued)

(52) U.S. Cl.
CPC .......... *G06F 21/53* (2013.01); *G06F 9/45558* (2013.01); *G06F 21/50* (2013.01);
(Continued)

(58) Field of Classification Search
CPC .......... G06F 21/53; G06F 21/57; G06F 21/72; G06F 21/78; G06F 9/45558; G06F 2009/45587
See application file for complete search history.

(56) References Cited

U.S. PATENT DOCUMENTS 6,161,185 A 12/2000 Guthrie et al.
6,377,691 B1 4/2002 Swift et al.
(Continued)

FOREIGN PATENT DOCUMENTS

CN 109218260 A 1/2019
CN 110851231 2/2020
(Continued)

OTHER PUBLICATIONS

Arfaoui et al. "Practical and Privacy-Preserving TEE Migration", 9th Workshop on Information Security Theory and Practice (WISTP), Aug. 2015, Heraklion, Greece. pp. 153-168, 17 pages.
(Continued)

*Primary Examiner* — Matthew T Henning
(74) *Attorney, Agent, or Firm* — Womble Bond Dickinson (US) LLP

(57) ABSTRACT

The technology disclosed herein enables a computing device to use a trusted execution environment in an untrusted device to distribute protected content to a set of one or more computing devices. An example method may include: transmitting, by a processor of a data distribution device, attestation data to a first computing device; establishing a trusted execution environment in the data distribution device, wherein the trusted execution environment comprises an encrypted storage area; loading data of the first computing device into the trusted execution environment in the data distribution device, wherein the data comprises protected content and comprises executable code to control access to the protected content; receiving, by the data distribution device, data of a second computing device; and causing the executable code to execute in the trusted execution environment to analyze the data of the second computing device and to provide the second computing device access to protected content.

20 Claims, 12 Drawing Sheets

(51) Int. Cl.
  *G06F 21/50*  (2013.01)
  *G06F 21/57*  (2013.01)
  *G06F 21/72*  (2013.01)
  *G06F 21/78*  (2013.01)
  *H04L 9/32*  (2006.01)

(52) U.S. Cl.
  CPC .............. *G06F 21/57* (2013.01); *G06F 21/72* (2013.01); *G06F 21/78* (2013.01); *H04L 9/32* (2013.01); *G06F 2009/45587* (2013.01)

(56) References Cited

U.S. PATENT DOCUMENTS

| | | |
|---|---|---|
| 7,024,695 B1 | 4/2006 | Kumar et al. |
| 8,443,187 B1 | 5/2013 | Orr |
| 8,966,021 B1 | 2/2015 | Allen |
| 9,032,414 B1 | 5/2015 | Dalal |
| 9,106,645 B1 | 8/2015 | Vadlamani |
| 9,219,611 B1 | 12/2015 | Naik |
| 9,225,735 B1 | 12/2015 | Banerjee |
| 9,544,287 B1 | 1/2017 | Sokolov et al. |
| 9,609,000 B2 | 3/2017 | Karame et al. |
| 9,692,599 B1 | 6/2017 | Krahn |
| 9,813,402 B1 | 11/2017 | Chen et al. |
| 9,876,823 B2 | 1/2018 | Smith et al. |
| 9,948,681 B1 | 4/2018 | Kruse et al. |
| 9,992,018 B1 | 6/2018 | Tjew |
| 10,044,695 B1 | 8/2018 | Cahill et al. |
| 10,055,561 B2 | 8/2018 | Moore |
| 10,390,222 B2 | 8/2019 | Khosravi et al. |
| 10,447,663 B2 | 10/2019 | Sun et al. |
| 10,454,975 B1 | 10/2019 | Sharifi Mehr |
| 10,558,812 B2 | 2/2020 | Thom et al. |
| 10,650,003 B1 | 5/2020 | Rubin et al. |
| 10,666,643 B2 | 5/2020 | Mathew et al. |
| 10,740,466 B1 | 8/2020 | Bshara et al. |
| 10,880,283 B1 | 12/2020 | Roth et al. |
| 10,979,430 B1 | 4/2021 | Hitchcock et al. |
| 11,051,163 B1 | 6/2021 | Smith et al. |
| 11,055,273 B1 | 7/2021 | Meduri et al. |
| 11,115,423 B2 | 11/2021 | Drake, II et al. |
| 11,190,517 B2 | 11/2021 | Drake, II et al. |
| 11,509,658 B1 | 11/2022 | Kulkarni |
| 11,947,659 B2 * | 4/2024 | Bursell ................. H04L 9/0631 |
| 2002/0034302 A1 | 3/2002 | Moriai et al. |
| 2003/0191943 A1 | 10/2003 | Poisner et al. |
| 2005/0086419 A1 | 4/2005 | Neble et al. |
| 2007/0294376 A1 | 12/2007 | Ayachitula et al. |
| 2008/0098464 A1 | 4/2008 | Mizrah |
| 2008/0229103 A1 | 9/2008 | Mutka et al. |
| 2008/0256598 A1 | 10/2008 | Diab |
| 2008/0298588 A1 | 12/2008 | Shakkarwar |
| 2010/0268747 A1 | 10/2010 | Kern et al. |
| 2011/0035577 A1 * | 2/2011 | Lin ........................ G06F 21/10 713/150 |
| 2011/0213985 A1 | 9/2011 | Miller |
| 2011/0302415 A1 * | 12/2011 | Ahmad .................. H04L 63/08 713/168 |
| 2012/0084835 A1 | 4/2012 | Thomas et al. |
| 2012/0131653 A1 | 5/2012 | Pasquero et al. |
| 2012/0159591 A1 | 6/2012 | Payne et al. |
| 2012/0166141 A1 | 6/2012 | Watkins et al. |
| 2013/0018941 A1 | 1/2013 | Olaru |
| 2013/0036462 A1 | 2/2013 | Krishnamurthi |
| 2013/0152183 A1 | 6/2013 | Plewnia et al. |
| 2014/0019577 A1 | 1/2014 | Lobo et al. |
| 2014/0109190 A1 | 4/2014 | Cam-Winget et al. |
| 2014/0205099 A1 | 7/2014 | Christodorescu et al. |
| 2014/0245396 A1 | 8/2014 | Oberheide et al. |
| 2014/0282964 A1 | 9/2014 | Stubblefield |
| 2014/0359290 A1 | 12/2014 | McCusker et al. |
| 2015/0113618 A1 | 4/2015 | Sinha et al. |
| 2015/0227744 A1 | 8/2015 | Horovitz et al. |
| 2015/0318998 A1 | 11/2015 | Erlikhman et al. |
| 2015/0326398 A1 | 11/2015 | Modarresi et al. |
| 2016/0065376 A1 | 3/2016 | Smith et al. |
| 2016/0087792 A1 | 3/2016 | Smith et al. |
| 2016/0088021 A1 | 3/2016 | Jayanti Venkata et al. |
| 2016/0180068 A1 | 6/2016 | Das et al. |
| 2016/0180078 A1 | 6/2016 | Chhabra et al. |
| 2016/0248752 A1 | 8/2016 | Blinn |
| 2016/0294562 A1 | 10/2016 | Oberheide et al. |
| 2016/0316364 A1 | 10/2016 | Blanco et al. |
| 2016/0342774 A1 | 11/2016 | Henkel-Wallace et al. |
| 2016/0371475 A1 | 12/2016 | Zhao et al. |
| 2017/0012959 A1 | 1/2017 | Sierra et al. |
| 2017/0032111 A1 | 2/2017 | Johansson et al. |
| 2017/0126661 A1 | 5/2017 | Brannon |
| 2017/0195457 A1 | 7/2017 | Smith, II et al. |
| 2017/0244709 A1 | 8/2017 | Jhingran et al. |
| 2017/0257363 A1 | 9/2017 | Franke et al. |
| 2017/0279795 A1 | 9/2017 | Redberg |
| 2017/0289118 A1 | 10/2017 | Khosravi et al. |
| 2017/0300683 A1 | 10/2017 | Movsisyan et al. |
| 2017/0302445 A1 | 10/2017 | Kobayashi et al. |
| 2017/0329966 A1 | 11/2017 | Koganti et al. |
| 2017/0351536 A1 | 12/2017 | Kamalakantha et al. |
| 2017/0366532 A1 | 12/2017 | Garfinkle et al. |
| 2017/0374014 A1 | 12/2017 | Sastri |
| 2017/0374049 A1 | 12/2017 | Ateniese et al. |
| 2018/0004930 A1 | 1/2018 | Csinger et al. |
| 2018/0007060 A1 | 1/2018 | Leblang et al. |
| 2018/0026940 A1 | 1/2018 | Sastri |
| 2018/0083932 A1 | 3/2018 | Adams |
| 2018/0097787 A1 | 4/2018 | Murthy et al. |
| 2018/0097789 A1 | 4/2018 | Murthy et al. |
| 2018/0101847 A1 | 4/2018 | Pisut, IV |
| 2018/0109504 A1 | 4/2018 | Poffenbarger |
| 2018/0114000 A1 | 4/2018 | Taylor |
| 2018/0136943 A1 | 5/2018 | Chew et al. |
| 2018/0150331 A1 | 5/2018 | Chen et al. |
| 2018/0176212 A1 | 6/2018 | Nair |
| 2018/0183586 A1 | 6/2018 | Bhargav-Spantzel et al. |
| 2018/0212769 A1 | 7/2018 | Novak |
| 2018/0254898 A1 | 9/2018 | Sprague et al. |
| 2018/0270068 A1 | 9/2018 | Innis et al. |
| 2018/0288060 A1 | 10/2018 | Jackson et al. |
| 2018/0309567 A1 | 10/2018 | Wooden |
| 2018/0351944 A1 | 12/2018 | Cho et al. |
| 2018/0367542 A1 | 12/2018 | Wolf et al. |
| 2018/0375659 A1 | 12/2018 | Kozma et al. |
| 2018/0375852 A1 | 12/2018 | Thom et al. |
| 2019/0007384 A1 | 1/2019 | Maaroufi et al. |
| 2019/0028456 A1 | 1/2019 | Kurian |
| 2019/0036957 A1 | 1/2019 | Smith et al. |
| 2019/0050557 A1 | 2/2019 | Martin et al. |
| 2019/0065731 A1 | 2/2019 | Brocious et al. |
| 2019/0068633 A1 | 2/2019 | Tsirkin |
| 2019/0097790 A1 | 3/2019 | Li et al. |
| 2019/0097987 A1 | 3/2019 | Talur |
| 2019/0109839 A1 | 4/2019 | Reston et al. |
| 2019/0139148 A1 | 5/2019 | Piel |
| 2019/0156301 A1 | 5/2019 | Bentov et al. |
| 2019/0176753 A1 | 6/2019 | Suzuki et al. |
| 2019/0188368 A1 | 6/2019 | Hastings |
| 2019/0190903 A1 | 6/2019 | Chen et al. |
| 2019/0199725 A1 | 6/2019 | Pularikkal et al. |
| 2019/0208009 A1 | 7/2019 | Prabhakaran et al. |
| 2019/0222575 A1 | 7/2019 | Oberhauser et al. |
| 2019/0243963 A1 | 8/2019 | Soriente et al. |
| 2019/0280863 A1 | 9/2019 | Meyer et al. |
| 2019/0289017 A1 | 9/2019 | Agarwal |
| 2019/0334921 A1 | 10/2019 | Pattar et al. |
| 2019/0342080 A1 | 11/2019 | Vakili et al. |
| 2019/0364034 A1 | 11/2019 | Alexander |
| 2019/0392305 A1 | 12/2019 | Gu et al. |
| 2020/0007531 A1 | 1/2020 | Koottayi et al. |
| 2020/0007536 A1 | 1/2020 | Piel |
| 2020/0007576 A1 | 1/2020 | Buhacoff |
| 2020/0027022 A1 | 1/2020 | Jha et al. |
| 2020/0028693 A1 | 1/2020 | Wu et al. |
| 2020/0057664 A1 | 2/2020 | Durham et al. |
| 2020/0067716 A1 | 2/2020 | Camenisch et al. |
| 2020/0076829 A1 | 3/2020 | Wentz |

(56) References Cited

U.S. PATENT DOCUMENTS

| | | |
|---|---|---|
| 2020/0092284 A1 | 3/2020 | Zhu et al. |
| 2020/0125717 A1 | 4/2020 | Wang et al. |
| 2020/0125772 A1 | 4/2020 | Volos et al. |
| 2020/0137031 A1 | 4/2020 | Pappachan et al. |
| 2020/0162454 A1 | 5/2020 | Jain et al. |
| 2020/0175208 A1 | 6/2020 | Yu et al. |
| 2020/0184467 A1 | 6/2020 | Segaran et al. |
| 2020/0195639 A1 | 6/2020 | Chien |
| 2020/0244636 A1 | 7/2020 | Varanasi et al. |
| 2020/0259799 A1 | 8/2020 | Li et al. |
| 2020/0304488 A1 | 9/2020 | Mimis |
| 2020/0304543 A1 | 9/2020 | Hamlin et al. |
| 2020/0382323 A1 | 12/2020 | Keselman et al. |
| 2020/0403994 A1 | 12/2020 | Bitterfeld et al. |
| 2020/0404003 A1 | 12/2020 | Alameh et al. |
| 2021/0004454 A1 | 1/2021 | Chester et al. |
| 2021/0004469 A1 | 1/2021 | Chisnall et al. |
| 2021/0150044 A1 | 5/2021 | Christofferson et al. |
| 2021/0152371 A1 | 5/2021 | Fletcher et al. |
| 2021/0218734 A1 | 7/2021 | Kapinos et al. |
| 2021/0243180 A1 | 8/2021 | Beale et al. |
| 2021/0243206 A1 | 8/2021 | Shivanna |
| 2021/0281577 A1 | 9/2021 | Sasaki et al. |
| 2021/0297412 A1 | 9/2021 | Thayyilsubramanian et al. |
| 2021/0312047 A1 | 10/2021 | Chen |
| 2021/0314149 A1 | 10/2021 | Yee et al. |
| 2021/0314298 A1 | 10/2021 | Chen et al. |
| 2021/0374232 A1 | 12/2021 | Bursell |
| 2021/0374233 A1 | 12/2021 | Bursell |
| 2021/0374234 A1 | 12/2021 | Bursell |
| 2021/0385183 A1 | 12/2021 | Henao Mota |
| 2022/0012725 A1 | 1/2022 | Rutter et al. |
| 2022/0050896 A1 | 2/2022 | Ahmed |
| 2022/0109663 A1 | 4/2022 | Swain et al. |
| 2022/0116375 A1 | 4/2022 | Bursell |
| 2022/0206764 A1 | 6/2022 | Scarlata et al. |

FOREIGN PATENT DOCUMENTS

| | | | |
|---|---|---|---|
| WO | WO-2009030888 A1 * | 3/2009 | ............. G06F 21/10 |
| WO | 2019075234 A1 | 4/2019 | |
| WO | 2019179543 | 9/2019 | |
| WO | 2020104032 A1 | 5/2020 | |
| WO | 2020125942 A1 | 6/2020 | |

OTHER PUBLICATIONS

Xiao, et al., "Enforcing Private Data Usage Control with Blockchain and Attested Off-Chain Contract Execution", Virginia Polytechnic Institute and State University, Apr. 15, 2019, 16 pages.

Radboud University Nijmegen, The Netherlands; SURFnet bv, Utrecht, The Netherlands, van Rijswijk-Dij, Roland and Poll, Erik, "Using Trusted Execution Environments in Two-factor Authentication: Comparing Approaches", https://dl.gi.de/bitstream/handle/20.500.12116/17195/20.pdf?sequence=1, 12 pages, Sep. 2023.

* cited by examiner

DATA RETRIEVAL
140

DATA DISTRIBUTION USING A TRUSTED EXECUTION ENVIRONMENT IN AN UNTRUSTED DEVICE

TECHNICAL FIELD

The present disclosure generally relates to computer systems that provide security enhanced data exchange between computers, and is more specifically related to establishing and using a Trusted Execution Environment (TEE) in a computer device to transfer data between the computers.

BACKGROUND

Computers often use cryptographic techniques to restrict access to sensitive content. The cryptographic techniques often involve generating a secret key that is used by a device to encrypt the sensitive content. The secret key may be something as simple as a passcode or something more complex, such as a cryptographic token. The device may use the secret key as input to a cryptographic function to encrypt the content or decrypt the content. If the secret key is correct, the decryption will enable access to the content and if the secret key is incorrect, the cryptographic function should fail to properly decrypt the content.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
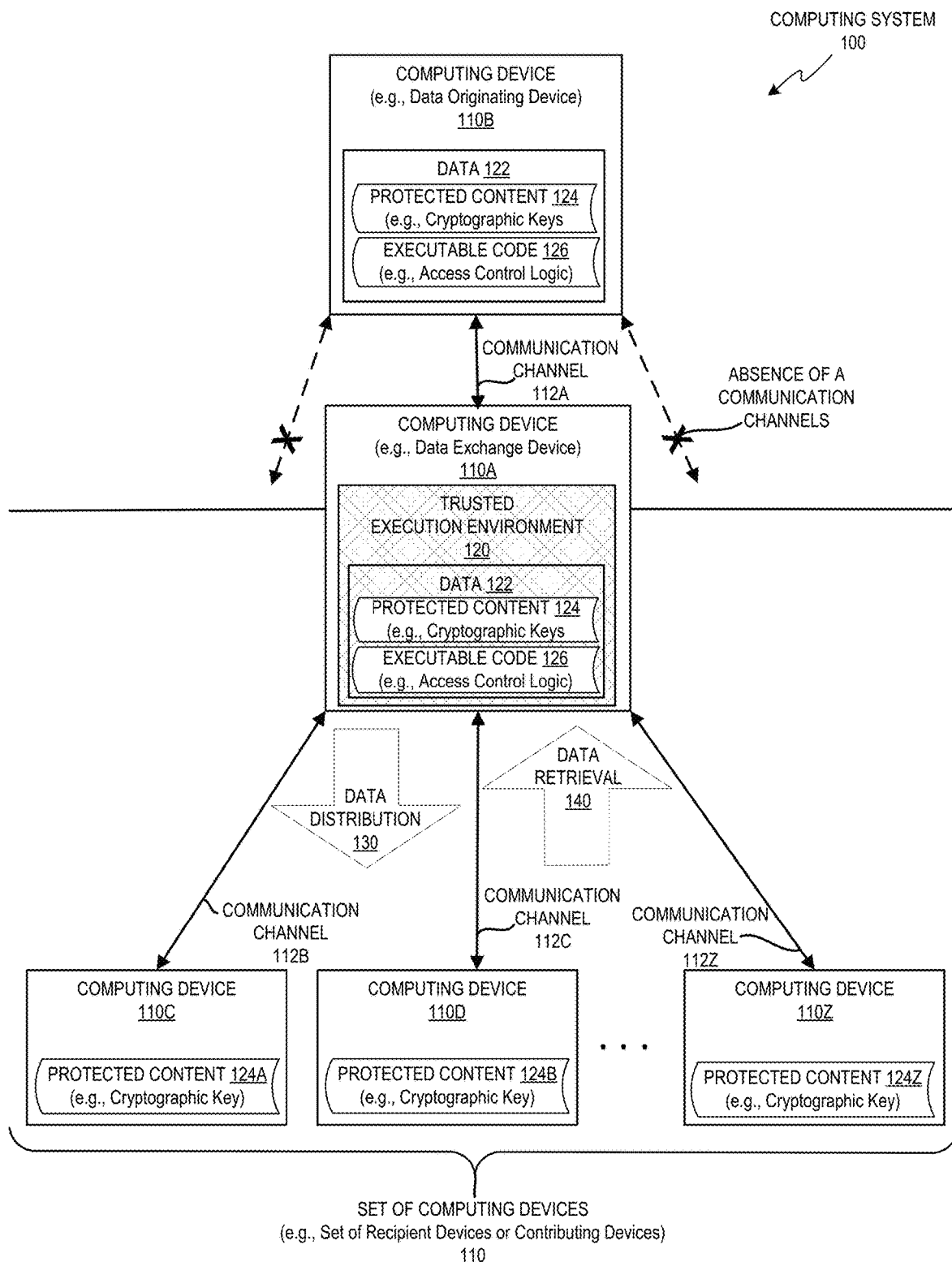
FIG. 1 depicts a high-level block diagram of an example computing system that uses a trusted execution environment in a computing device to transfer protected content between other computing devices, in accordance with one or more aspects of the present disclosure.

Modern computing devices often use cryptographic techniques to enable content to be shared between particular devices while restricting other devices from accessing the content. The cryptographic techniques often involve establishing an encrypted session between the particular devices. Establishing the encrypted session often involves a trusted third party and the use of multiple back-and-forth communications over a shared connection between the particular devices. The use of a trusted third party or shared connection may increase complexity or security vulnerabilities and in some situations may be unavailable or not preferred.

The technology disclosed herein enables protected content to be transmitted between computing devices that are absent a direct connection by using another computing device that is configured to function as a data exchange device. The data exchange device may function as an intermediate device that can be communicatively coupled to each of the computing devices sequentially or in parallel to share the protected content between the computing devices. The data exchange device may be able to communicate with the computing devices at the same time or may communicate with a first computing device and then be moved to a different geographic location to communicate with the second computing device. The data exchange device may initially be untrusted by the computing devices and may be vulnerable to being maliciously compromised before, during, or after storing the protected content. The technology disclosed herein mitigates vulnerabilities of the data exchange device by establishing a trusted execution environment in the data exchange device.

The trusted execution environment (TEE) may execute one or more processes and use hardware based encryption to isolate the data of the processes from other processes running on the data exchange device. In one example, the data of a process executing in the trusted execution environment may be encrypted using cryptographic keys that are accessible to a hardware processor of the data exchange device but are inaccessible to all the processes running on the data exchange device (e.g., hardware level encryption). The hardware processor may encrypt or decrypt the data of the process executing in the trusted execution environment when the process stores or accesses the data. This enables the trusted execution environment to isolate data of a lower privileged process (e.g., application process or virtual machine process) executing within the trusted execution environment from being accessed by a higher privileged processes (e.g., kernel or hypervisor) even though the higher privileged processes may be responsible for managing the lower privileged process.

The data exchange device may use the trusted execution environment to store and execute data and may enable the data exchange device to function as a data distribution device, a data retrieval device, or a combination thereof. The data distribution device may be configured to receive data from a sending device and may provide a portion of the data to one or more recipient devices. The data received from the sending device may include protected content and executable code which implements logic that controls access to the protected content. The protected content may include sensitive data, confidential data, or other data and in one example may include cryptographic key data (e.g., secret key). The executable code may include logic for authenticating the recipient devices and for providing the authenticated recipient devices with access to the protected content.

Data exchange device may also or alternatively function as a data retrieval device and may use the trusted execution environment to retrieve protected content from one or more participant devices in a security enhanced manner. The protected content may be the same data that was distributed by the data distribution device or may be different data that originated from the participant devices or from another computing device. The data retrieval device may be untrusted by the participant devices and may include computer programs that may have security vulnerabilities and be subverted. To mitigate the security vulnerabilities, the data retrieval device may establish a trusted execution environment that is configured to store the protected content and executable code. The executable code may use the retrieved protected content to perform one or more operations. The participant devices may not initially trust the data retrieval device and may use remote attestation to validate the executable code in the trusted execution environment.

The remote attestation may involve the data retrieval device providing attestation data (e.g., configuration data, integrity data, hash data) to the participant devices and the attestation data may be used to verify that the operations implemented by the executable code in the trusted execution environment are valid. In one example, each participant device may be able to individually inspect source code associated with the executable code of the trusted execution environment to determine the operations it will perform. The source code may be accessed from any repository and then compiled and hashed to generate validation data (e.g., generated integrity data). The participant devices may compare the generated validation data with the attestation data received from the data retrieval device (e.g., comparing hashes). The comparison may be used to verify the executable code in the trusted execution environment without directly accessing the executable code in the trusted execution environment. The participant devices may then provide the protected content to the trusted execution environment, which may execute the executable code to perform one or more operations that use the protected content.

The data exchange device may be used to protect content during distribution or retrieval and may be particularly useful for content that includes a set of one or more cryptographic keys. When the protected content includes a cryptographic key, the data exchange device may be referred to as a key distribution device or a key retrieval device and may distribute or retrieve keys from one or more computing devices. When distributing keys, the trusted execution environment may be loaded with a set of keys and with executable code that provides the access control logic for the set of keys. When retrieving keys, the trusted execution environment may store executable code for retrieving keys from multiple participant devices and for using the keys to perform an operation. In one example, the set of cryptographic keys may be different keys for different devices and may be used individually or together to perform an operation.

Systems and methods described herein include technology that enables a computing device to use a trusted execution environment to transfer data between computing devices. In particular, aspects of the disclosed technology may enable computing devices to transfer protected content in the absence of a direct communication by loading the protected content and executable code that controls access to the protected content into a trusted execution environment of a data exchange device. The executable code may be used to authenticate and provide access to the protected content without requiring a mutually trusted third party (e.g., certificate authority) or back-and-forth communication between the sending and receiving devices (e.g., security handshake). In other aspects, the disclosed technology may enable the data exchange device to securely transfer the protected content without exposing the protected content to an operating system of the data exchange device, which may or may not have been subverted (e.g., maliciously compromised). The trusted execution environment may be implemented and enforced by a hardware processor and may isolate the protected content and executable code from being accessed by any and all processes executed outside the trusted execution environment. Therefore, if the operating system, driver, or application of the data exchange device was maliciously compromised it would not have access to data of the processes executing in the trusted execution environment of the data exchange device.

Various aspects of the above referenced methods and systems are described in details herein below by way of examples, rather than by way of limitation. The examples provided below discuss a computing device that is used as a data exchange device to perform data distribution and data retrieval. In other examples, the data exchange device may perform data distribution without performing data retrieval or may perform data retrieval without performing data distribution.

FIG. 1 depicts an illustrative architecture of elements of a computer system 100, in accordance with an example of the present disclosure. It should be noted that other architectures for computer system 100 are possible, and that the implementation of a computer system utilizing embodiments of the disclosure are not necessarily limited to the specific architecture depicted. In the example shown in FIG. 1, computer system 100 may include computing devices 110A-Z and one or more of computing devices 110A-Z may include a trusted execution environment 120 that can be used to provide security enhanced data distribution 120, data retrieval 140, or a combination thereof.

Computing devices 110A-Z may include any computing devices that are capable of storing or accessing data and may include one or more servers, workstations, desktop computers, laptop computers, tablet computers, mobile phones, palm-sized computing devices, personal digital assistants (PDAs), smart watches, robotic devices (e.g., drone), data storage device (e.g., USB drive), other device, or a combination thereof. Computing devices 110A-Z may include one or more hardware processors based on x86, PowerPC®, SPARC®, ARM®, other hardware, or a combination thereof. In one example, One or more of the computing devices (e.g., 110A) may be a mobile device or non-mobile device that can be physically moved or logically moved between locations to communicate with one or more of the other computing devices (e.g., computing devices 110B-Z). Physically moving a computing device may change a physical location of the computing device and may involve transporting the computing device between geographic locations. Logically moving a computing device may change a logical location of the computing device and may involve transitioning the computing device between different virtual locations (e.g., different networks by changing network cables or settings).

The physical or logical movement may be implemented or caused by the computing device. In one example, the computing device 110A may be a mobile device that includes the ability to move or other locomotion features and may be the same or similar to an autonomous vehicle (e.g., robot, drone). In another example, the computing device may be capable of being moved and may communicate with an external entity (e.g., user, robot) that can move the mobile device. In either example, the physical or logical move may transition the computing device from a first location with access to a first set of one or more computing devices to a second location with access to a second set of one or more computing devices. Computing device 110A may then use communication channels 112A-Z to communicate with the computing devices at different times and locations.

Communication channels 112A-Z may include any communication channel that is capable of communicating data between computing devices and may include one or more connections. The connections may be network connections, computer-to-computer connections, peripheral connection, other connections, or a combination thereof. A network connection may be an indirect connection that traverses one or more network nodes (e.g., access points, switches, routers, or other networking infrastructure device) and may communicably couple one of computing devices with one or more other computing devices. A computer-to-computer connection may be the same or similar to a peer-to-peer connection and may be a direct connection between computing devices (e.g., bluetooth connection, WiFi Direct, ad-hoc network connection). A peripheral connection may be a connection that uses a direct physical connection between an adapter of the computer and an adapter of the portable data storage device (e.g., Universal Serial Bus (USB) connection). The peripheral connection may exist when one of the computing devices is a computer and the other is a portable data storage device (e.g., USB drive, key fob, secure card).

Communication channels 112A-Z may exist for different durations of time and at different points in time. This may occur when the data exchange device is moved or reconfigured to communicate with other devices. In one example, the data exchange device (e.g., computing device 110A) may establish one of the communication channels 112A-Z with a first computing device at a first time and then remove communication channel before, during, or after establishing a subsequent communication channel with a second computing device. The one or more subsequent communication channels may be established sequentially or in parallel at subsequent points in time. In another example, one or more of communication channels may be a persistent communication channel and may exist before, during, and after other communication channels are established or removed. As shown in FIG. 1, computing device 110B may be absent communications channels with one or more of computing devices 110C-Z and may use computing device 110A to distribute data to one or more of computing devices 110C-Z.

Computing device 110A may updated to include a trusted execution environment 120 that can be loaded with data 122 that enables the computing device to perform data distribution 120, data retrieval 140, or a combination thereof. Data 122 may originate on computing device 110B and may be transferred from computing device 110B to computing device 110A and loaded into trusted execution environment 120. Trusted execution environment 120 may provide code execution, storage confidentiality, and integrity protection, and may store, execute, and isolate data 122 from other processes executing on computing device 110A, as discussed in more detail in regards to FIGS. 2-3. As shown in FIG. 1, data 122 may include protected content 124, executable code 126, other data, or a combination thereof.

Protected content 124 may be any data that is protected while stored on computing device 110A and can be shared between computing devices. Protected content 124 may be the same or similar to sensitive data, confidential data, secret data, classified data, or other data and may be protected using any technique that enhances data confidentiality, data integrity, data availability, or a combination thereof. Protected content 124 may include document data (e.g., documents, spread sheets, slides), image data (e.g., photos, videos), executable data (e.g., executables, libraries), non-executable data (e.g., informational data), other data, or a combination thereof. In one example, protected content 124 may include cryptographic key data of one or more cryptographic keys.

Cryptographic key data may include one or more cryptographic bit sequences or other cryptographic keying material for storing, generating, or deriving a set of one or more cryptographic keys. Cryptographic key data may be represented in a human readable form (e.g., passcode, password), a non-human readable form (e.g., digital token, digital signature, or digital certificate), other form, or a combination thereof. Cryptographic key data may be input for a cryptographic function, output of a cryptographic function, or a combination thereof. Cryptographic key data may include one or more encryption keys, decryption keys, session keys, transport keys, migration keys, authentication keys, authorization keys, integrity keys, verification keys, digital tokens, license keys, certificates, signatures, hashes, other data or data structure, or a combination thereof. The cryptographic key data may include any number of cryptographic keys and may be used as part of a cryptographic system that provides privacy, integrity, authentication, authorization, non-repudiation, other features, or a combination thereof.

In one example, the protected content 124 received from the data originating device may include a set of cryptographic keys. The set of cryptographic keys may include one or more keys for each of computing devices 110C-Z. Each key in the set may be related or unrelated to some or all of the other keys in the set. In one example, a key may be related to another key in the set if they are both the output of a key splitting operation. The key splitting operation may split a cryptographic key into multiple keys (e.g., key AB split into key A and key B). In another example, a key may be related to another key in the set if they are mathematically related via a public/private key relationship or via key thresholding. As used throughout this application, the term "key" or "cryptographic key" may be a general term that corresponds to any portion of key material (e.g., bit sequence) that is used as input to a cryptographic function. The term key may correspond to an entire key, a fragment of a key (e.g., key fragment, key part, key portion, key piece, key element, key unit, key share, key shard, other term), a combined key (e.g., aggregate key, composite key, combination key, merged key), other bit sequence, or a combination thereof. Any use of the term key fragment or key share may be replaced with key without changing the concepts discussed. Two or more of the keys in the set may be combined and provided as a single input or as separate inputs to a cryptographic function. In one example, all of the keys in a set may be used together and if one or more of the keys in the set are unknown to the recipient computing device, the recipient computing device may be unable to successfully complete a cryptographic operation (e.g., decryption or authorization operation). In another example, a subset of the keys in the set may be used together even though one or more keys in the set are unknown or unavailable (e.g., key thresholding, key sharding). In the latter example, the quantity of keys in the subset may need to satisfy a minimum threshold number to enable the cryptographic operation to complete successfully. For example, a set may include seven keys (n=7) and the minimum threshold may be configured to be the integer value three (t=3) and if the subset has at least three of the seven keys, the content may be accessible (e.g., t of n).

The cryptographic key data may be used by one or more of the computing devices 110A-Z in combination with asymmetric and/or symmetric cryptographic systems. An symmetric key cryptographic system may use the same cryptographic keys for encryption of plaintext and for decryption of ciphertext. The cryptographic keys used in a symmetric key cryptographic system may be referred to as symmetric keys and may be identical keys (e.g., copies of the same key) or there may be a simple transformation to go between keys of a symmetric key pair. The symmetric key cryptographic system may involve stream ciphers, block ciphers, other cipher, or a combination thereof. The stream ciphers may encrypt individual elements (e.g., digits, characters) of a message one at a time. Block ciphers may take a set of elements and encrypt them as a single unit and may or may not pad the resulting plaintext so that it is a multiple of a block size of n bits (e.g., 64 bit, 128 bit, 256 bit, 1024 bit). In one example, the symmetric key cryptographic system may use one or more key wrap constructions that wrap or encapsulate cryptographic key material. The constructions may be built from standard primitives such as block ciphers and cryptographic hash functions. In other examples, the symmetric key cryptographic system may be the same or similar to Advanced Encryption Standard (AES), Galois/Counter Mode (GCM), Triple Data Encryption Standard (3DES, TDES), International Data Encryption Algorithm (IDEA), Blowfish, Lattice-based cryptography, multivariate cryptography (e.g., rainbow scheme), super singular elliptic curve cryptography, super singular isogeny graphs cryptography, other cryptographic system, or a combination thereof.

An asymmetric key cryptographic system may use different keys for encryption and decryption. A first key may be used to encrypt plaintext into ciphertext and a second key may be used to decrypt the ciphertext into plaintext. The first and second keys may be referred to as an asymmetric pair and may be different keys that may or may not be mathematically related. In one example, the asymmetric key cryptographic system may be a public key cryptographic system and the first key may be a public key (e.g., shared key) and the second key may be a private key (e.g., secret key). The public key may be published and accessible to multiple computing devices and the private key may remain secret and accessible to one or more computing device associated with a particular entity (e.g., user). A public key cryptographic system may enable any device to encrypt data using the public key of a recipient computing device. The encrypted data may be decrypted with the recipient's private key.

Executable code 126 may be loaded into trusted execution environment 120 and may control how computing device 110A interacts with protected content 124. In one example, executable code 126 and protected content 124 may be received from the same computing device (e.g., 110B) and loaded into the trusted execution environment 120 together. In another example, executable code 126 and protected content 124 may be received from different computing devices and loaded separately into trusted execution environment 120. For example, the executable data 122 may be received from or generated by a first computing device (e.g., 110A or 110B) and portions of protected content 124 may be received from one or more other computing devices (e.g., 110B-Z). In either example, executable code 126 may include executable data, configuration data, other data, or a combination thereof and may be stored and executed in the trusted execution environment 120 as discussed in more detail in regards to FIGS. 4-6. Executable code 126 may be stored in any format and may include one or more file system objects (e.g., files, directories, links), database objects (e.g., records, tables, field value pairs, tuples), other storage objects, or a combination thereof. Executable code 126 may implement logic for controlling the distribution, retrieval, or use of protected content 124 and logic that is implemented may depend on whether the use of the data exchange device is for data distribution 120, data retrieval 140, or a combination thereof.

Data distribution 120 may involve configuring computing device 110A as a data distribution device that shares protected content 124 of a data originating device with one or more of data recipient devices. As discussed above, the data originating device (e.g., computing device 110B) may be absent a communication channel with computing devices 110C-Z and may use computing device 110A as a data distribution device, a data storage device, a courier device, a data transfer device, gateway device, or other device. Computing device 110A may receive executable data 122 and protected content 124 from the data originating device. Protected content 124 may include protected content 124A-Z and the executable data 122 may include access control logic that controls the distribution of protected content 124A-Z to the recipient devices. Configuring computing device 110A to perform data distribution 120 is discussed in more detail in regards to FIG. 4 and may include logic for controlling the authentication, authorization, and access of computing devices 110C-Z to protected content 124.

Data retrieval 140 may involve configuring computing device 110A to retrieve protected content 124 from one or more participant devices (e.g., set of computing devices 110). When performing data retrieval 140, computing device 110A may be referred to as a data retrieval device (e.g., key retrieval device), data acquisition device (e.g., key acquisition device), data procurement device (e.g., key procurement device), other device, or a combination thereof. As discussed above, the participant devices may not trust some or all of the other participant devices and may include protected content 124A-Z that is to remain hidden from the other participant devices. The data retrieval device may also be untrusted by the participant devices initially but may be configured with a trusted execution environment 120 and remote attestation operations to establish trust with the participant devices. The remote attestation operations are discussed in more detail in regards to FIG. 3 and may enable the data retrieval device to verify to each of the participant devices the integrity and confidentiality of executable code 126 and trusted execution environment 120. Configuring computing device 110A to perform data retrieval 140 is discussed in more detail in regards to FIG. 5.

Figure 2:
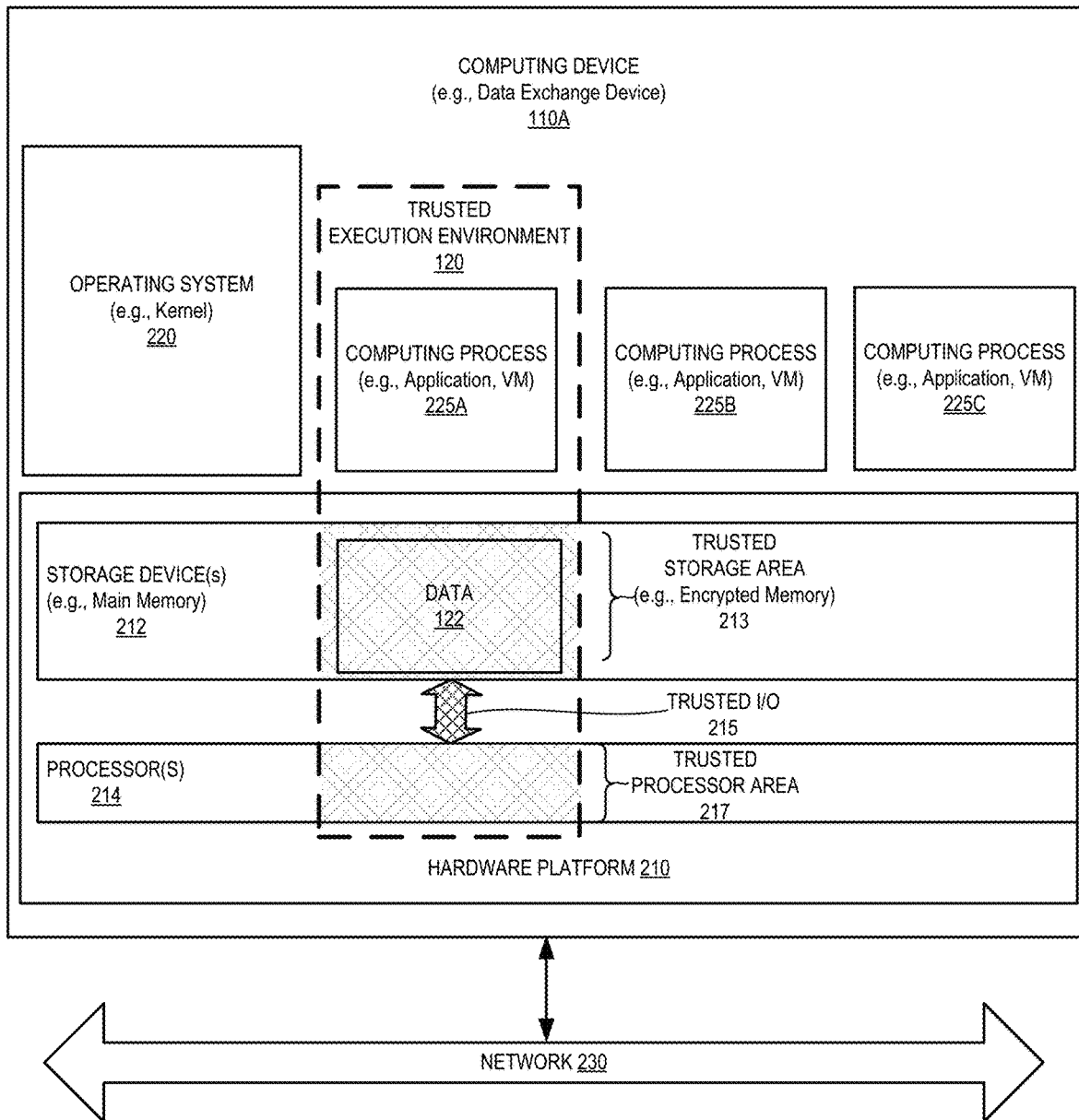
FIG. 2 depicts a block diagram of an example computing device that includes a trusted execution environment, in accordance with one or more aspects of the present disclosure.

FIG. 2 depicts an example of a trusted execution environment that may be established in computing device 110A, in accordance with an embodiment of the present disclosure. Computing device 110A may be the same or similar to one or more of computing devices 110A-Z of FIG. 1 and may include a hardware platform 210, a trusted execution environment 120, an operating system 220, one or more computing processes 225A-C, and a network 230. It should be noted that other architectures for computing device 110A are possible, and that the implementations of the computing device utilizing embodiments of the disclosure are not necessarily limited to the specific architecture depicted.

Hardware platform 210 may include one or more hardware devices that perform computing tasks for computing device 110A. Hardware platform 210 may include one or more data storage devices, computer processors, Basic Input Output services (BIOS), code (e.g., firmware), other aspects, or a combination thereof. One or more devices of the hardware platform 210 may be combined or consolidated into one or more physical devices or may partially or completely emulated as a virtual device or virtual machine. In the example in FIG. 1, hardware platform 210 may include one or more storage devices 212 and processors 214.

Storage devices 212 may include any data storage device that is capable of storing data and may include physical memory devices. The physical memory devices may include volatile memory devices (e.g., RAM, DRAM, SRAM), non-volatile memory devices (e.g., NVRAM), other types of memory devices, or a combination thereof. Storage devices 212 may also or alternatively include mass storage devices, such as hard drives (e.g., Hard Disk Drives (HDD)), solid-state storage (e.g., Solid State Drives (SSD)), other persistent data storage, or a combination thereof. Storage devices 212 may be capable of storing data 122 associated with one or more of the computing processes 225A-C. In one example, data of computing process 225A may be received from a device that is internal or external to computing device 110A. The data may be encrypted using a cryptographic key that was provided (e.g., determined, derived, generated, assigned) by computing device 110A or by a different computing device. The received data may be decrypted using the same cryptographic key or a derivative of the cryptographic key and the decrypted data may be loaded into the trusted execution environment 120 (as shown by data 122) before, during or after being re-encrypted.

Processors 214 may be communicably coupled to storage devices 212 and be capable of executing instructions encoding arithmetic, logical, or I/O operations. Processors 214 may include one or more general processors, Central Processing Units (CPUs), Graphical Processing Units (GPUs), Application Specific Integrated Circuits (ASICs), secure cryptoprocessors, Secure Elements (SE), Hardware Security Module (HSM), other processing unit, or a combination thereof. Processors 214 may be a single core processor, which may be capable of executing one instruction at a time (e.g., single pipeline of instructions) or a multi-core processor, which may simultaneously execute multiple instructions. Processors 214 may interact with storage devices 212 and provide one or more features defined by or offered by trusted systems, trusted computing, trusted computing base (TCB), trusted platform module (TPM), hardware security module (HSM), secure element (SE), other features, or a combination thereof.

Processors 214 may establish a trusted execution environment across multiple hardware devices of hardware platform 210 (e.g., processor and storage devices) and may include instructions (e.g., opcodes) to initiate, configure, and maintain the trusted execution environment 120. In one example, a trusted execution environment may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, IBM PEF, RISC-V Sanctum, other technology, or a combination thereof.

Trusted execution environment 120 may be a security enhanced area in computing device 110 that may guard the data of a computing process from being accessed by other computing processes on computing device 110A-C. A trusted execution environment may be the same or similar to a trust domain and may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Trusted execution environment 120 may protect data 122 while data 122 is in use (e.g., processed by processor 214), is in motion (e.g., transmitted over network 230), is at rest (e.g., stored in storage device 212), or a combinational thereof. Trusted execution environment 120 may be a set of one or more trusted execution environments and each of the trusted execution environments may be referred to as an instance of a trusted execution environment (i.e., TEEi). Each trusted execution environment 120 may isolate data of at least one process executed in trusted execution environment from processes executing external to the trusted execution environment. The at least one process may be a set of one or more processes associated with an execution construct being guarded by the trusted execution environment 120.

The execution construct may be a virtual machine, container, computing process, thread, instruction stream, or a combination thereof. In one example, trusted execution environment 120 may execute a particular virtual machine (e.g. VM based TEE) and may guard data of the virtual machine from a hypervisor managing the virtual machine. In this example, computing device 110A may execute executable code in trusted execution environment 120 as a virtual machine process and the executable code in the trusted execution environment may be accessible to the virtual machine process and inaccessible to a hypervisor managing the virtual machine process. As such, the trusted execution environment 120 of computing device may host a virtual machine that executes the executable data and all the data in the trusted execution environment may be accessible to the virtual machine and inaccessible to a hypervisor managing the virtual machine.

In another example, trusted execution environment 120 may be associated with a particular computing process (e.g., process based TEE) and may guard data of the particular computing process from being access by other equally privileged, higher privileged, or lower privileged computing processes (e.g., guard application process against higher privileged Operating System (OS) process). In this example, computing device 110 may execute the executable code in trusted execution environment 120 as one or more application processes and the executable code in the trusted execution environment 120 may be accessible to the one or more application processes and inaccessible to a kernel managing the one or more application processes. As such, trusted execution environment 120 of computing device 110A may host one or more application processes that execute the executable data and the data in the trusted execution environment may be accessible to the one or more application processes and be inaccessible to a kernel managing the one or more application processes. In either example, the data in the trusted execution environment 120 may be guarded by storing the data 122 in a trusted storage area 213.

Trusted storage area 213 may be an area of one or more storage devices 212 that stores data of a computing process. As shown in FIG. 1, trusted storage area 213 may be a part of trusted execution environment 120 and may store data 122 of computing process 225A in an encrypted form. Data 122 may be encrypted and decrypted by hardware devices using cryptographic input that includes one or more cryptographic keys. In one example, the cryptographic keys may be accessible to the hardware devices (e.g., processor 214) and may be inaccessible to operating system level processes executed by the hardware device. In another example, the cryptographic keys may be accessible to hardware devices and one or more computing processes, such as, the computing process associated with the trusted execution environment. In either example, the encryption and decryption performed by the hardware device may be referred to as hardware based encryption, hardware level encryption, hardware assisted encryption, hardware enforced encryption, process transparent encryption, other term, or a combination thereof and may use cryptographic key data (e.g., encryption and decryption keys) that are accessible to the processor and are inaccessible to all processes executed external to the trusted execution environment 120.

Trusted storage area 213 may include a portion of memory and may be referred to as an encrypted memory area. An encrypted memory area may be a contiguous or non-contiguous portion of virtual memory, logical memory, physical memory, other storage abstraction, or a combination thereof. The encrypted memory area may correspond to or be mapped to a portion of primary memory (e.g., main memory), auxiliary memory (e.g., solid state storage), adapter memory (e.g., memory of graphics card, or network interface cart), other persistent or non-persistent storage, or a combination thereof. In one example, the encrypted memory area may be a portion of main memory associated with a particular process and the processor may encrypt the data when storing the data in the memory area and may decrypt the data when retrieving the data from the memory area. The data in the memory area may be transformed (e.g., encrypted or decrypted) before, during, or after it is stored in or retrieved from the memory area and may remain in an encrypted form while in the encrypted memory area.

Trusted storage area 213 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 213 may be transmitted to other hardware devices using trusted IO 215.

Trusted IO 215 may enable the data of a computing process to be transmitted between hardware devices in a security enhanced manner. The data may be transmitted over one or more system buses, networks, or other communication channel in an encrypted or partially encrypted form. This may be advantageous because transmitting the data in an encrypted form may limit the ability of the data to be snooped while being transmitted between hardware devices. As shown in FIG. 1, trusted IO 215 may enable the data of computing process 225A to be transmitted between trusted storage area 213 and trusted processor area 217.

Trusted processor area 217 may be a portion of processor 214 that is associated with computing process 225A and guards data of computing process 225 from being accessed or modified by computing processes 225B-C. Trusted processor area 217 may include a portion of processor 214 that stores the data (e.g., CPU cache, processor memory or registers) and a portion of processor 214 that executes the data (e.g., processor core). Trusted processor area 217 may store the data in an encrypted form or in a decrypted form when it is present on the processor and in either example, the data of the computing process may be protected from being accessed or modified by other processes via the design of the processor and encryption may not be required to ensure isolation of the data when the data is within the processor packaging (e.g., chip packaging).

Computing device 110A may use the same processor and storage device to establish multiple instances of trusted execution environment 120. Each instance of a trusted execution environment (e.g., TEE instance, TEEi) may be established for a particular set of one or more computing processes and may be associated with a particular memory encrypted area. The instances of a trusted execution environment may be provided by the same hardware (e.g., processor and memory) but each instance may be associated with a different memory encrypted area and a different set of one or more processes (e.g., set including an individual process or set of all processes of a VM). Each instance may guard all data of a computing process or a portion of the data of a computing process. For example, computing process 225A (e.g., application or VM) may be associated with both a trusted execution environment and an untrusted execution environment. In this situation, a first portion of the data of computing process 225A may be stored and/or executed within trusted execution environment 120 and a second portion of the data of computing process 225A may be stored and/or executed within an untrusted execution environment. The second portion may be stored in the same storage device as the first portion but the second portion may be stored in a decrypted form and may be executed by processor 214 in a manner that enables another process (e.g., multiple higher privileged processes) to access or modify the data. In either example, trusted execution environment may be used to execute one or more of the computing processes 225A-C.

Each of the computing processes 225A-C may include one or more streams of execution for executing programmed instructions. A stream of instructions may include a sequence of instructions that can be executed by one or more processors. Each of the computing processes may be managed by an operating system 220 or may part of an operating system (e.g., kernel, not shown). In one example, a computing process may be an instance of a computer program that is being executed and may contain program code (e.g., executable code, executable data) and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes 225A-C may correspond to one or more applications, containers, virtual machines, or a combination thereof. Applications may be programs executing with user space privileges and may be referred to as application processes, system processes, services, background processes, or user space processes. A user space process (e.g., user mode process, user privilege process) may have lower level privileges that provide the user space process access to a user space portion of data storage without having access to a kernel space portion of data storage. In contrast, a kernel process may have higher privileges that provide the kernel process access to a kernel space portion and to user space portions that are not guarded by a trusted execution environment. In one example, the privilege associated with a user space process may change during execution and a computing process executing in user space (e.g., user mode, user land) may be granted enhanced privileges by an operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

The privilege levels of a computing process may be the same or similar to protection levels of processor 214 (e.g., processor protection rings) and may indicate an access level of a computing process to hardware resources (e.g., virtual or physical resources). There may be multiple different privilege levels assigned to the computing process. In one example, the privilege levels may correspond generally to either a user space privilege level or a kernel privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Operating system 220 may include one or more programs that are run to manage one or more of the computing processes 225A-C. Operating system 220 may include a kernel that execute as one or more kernel processes and may manage access to physical or virtual resources provided by hardware devices. A kernel process may be an example of a computing process associated with a higher privilege level (e.g., hypervisor privilege, kernel privilege, kernel mode, kernel space, protection ring 0). In one example, operating system 220 may be a host operating system, guest operating system, or a portion thereof and the computing processes 225A-C may be different applications that are executing as user space processes. In another example, operating system 220 may be a hypervisor that provides hardware virtualization features and the computing processes 225A-C may be different virtual machines. In yet another examples, operating system may include a container runtime (e.g., Docker, Container Linux) that provides operating system level virtualization and the computing processes 225A-C may be different containers. In further examples, operating system 220 may provide a combination thereof (e.g., hardware virtualization and operating system level virtualization).

The kernel of operating system 220 may segregate storage devices 212 (e.g., main memory, hard disk) into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with both diminished privileges (e.g., user space mode, user space privilege) and those with enhanced privileges. In one example, the portion of storage devices 212 associated with the enhanced privileges may be designated as kernel space and the portion of storage devices 212 associated with the diminished privileges may be designated as user space. In other examples, there may be more or less than two portions.

When the kernel provides features of a hypervisor it may also be known as a virtual machine monitor (VMM) and may provide virtual machines with access to one or more features of the underlying hardware devices. A hypervisor may run directly on the hardware of computing device 110B (e.g., host machine) or may run on or within a host operating system (not shown). The hypervisor may manage system resources, including access to hardware devices. The hypervisor may be implemented as executable code and may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc.

Figure 3:
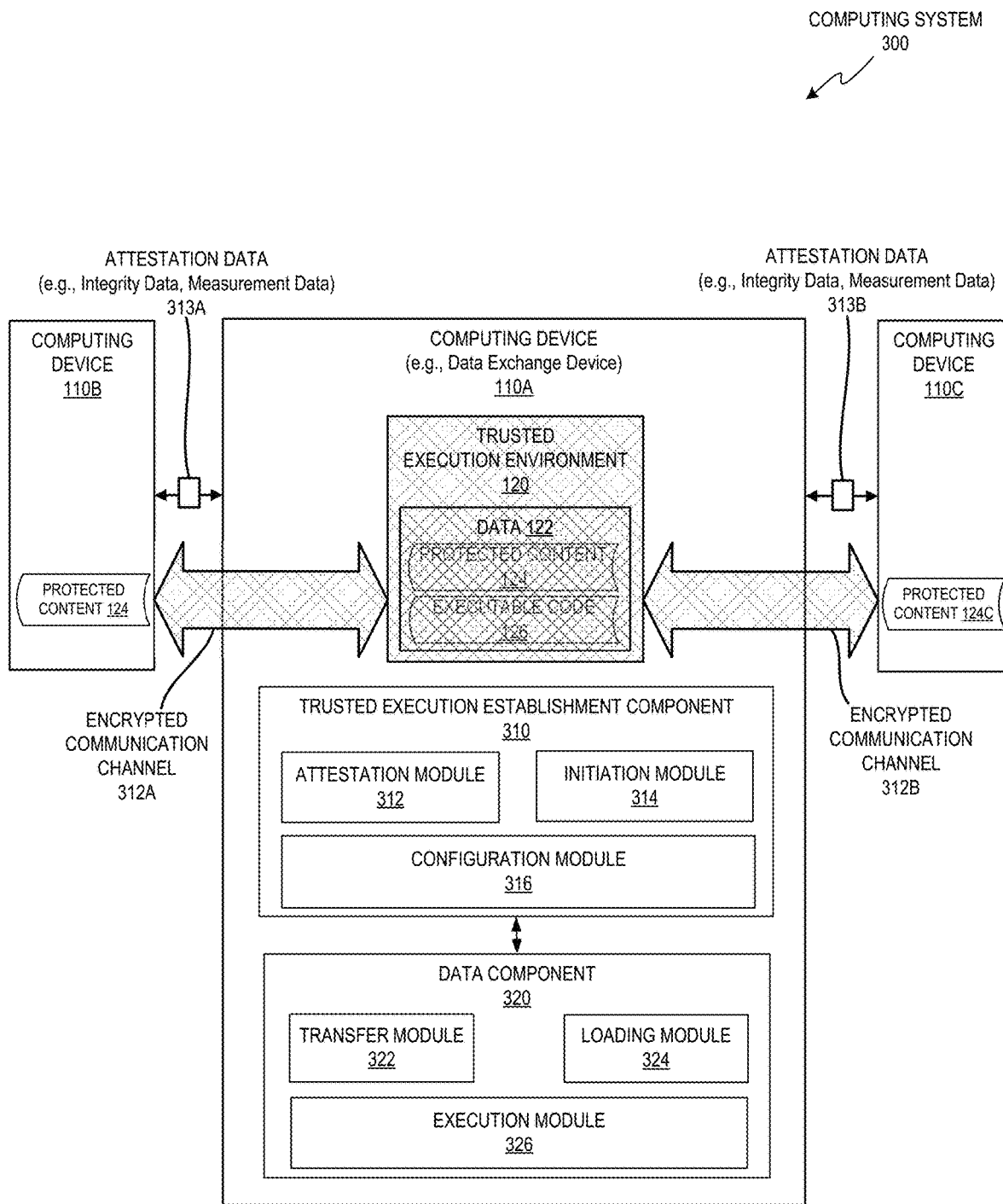
FIG. 3 depicts a block diagram of an example computing device with one or more components and modules for establishing a trusted execution environment, in accordance with one or more aspects of the present disclosure.

FIG. 3 depicts a block diagram illustrating an exemplary computing system 300 that uses a trusted execution environment in one of the computing devices to distribute or retrieve protected content from one or more other computing devices. In one example, computing device 110A may function as a data distribution device and may receive protected content from computing device 110B and distributed it to computing device 110C. In another example, computing device 110A may function as a data retrieval device and may receive protected content from both computing device 110B and 110C without transmitting protected content to any other computing devices.

Computing device 110A may include a trusted execution establishment component 310 and a data component 320. The components and modules discussed herein may be performed by any portion of a computing device. For example, one or more of the components or modules discussed below may be performed by processor circuitry, processor firmware, a driver, a kernel, an operating system, an application, other program, or a combination thereof. More or less components or modules may be included without loss of generality. For example, two or more of the components may be combined into a single component, or features of a component may be divided into two or more components. In one implementation, one or more of the components may reside on different computing devices.

Trusted execution establishment component 310 may enable computing device 110A to establish one or more trusted execution environments 120 in computing device 110A. Establishing a trusted execution environment may involve creating a new trusted execution environment or updating an existing trusted execution environment. Each of the one or more trusted execution environments may be associated with a set of one or more computing processes and may store and execute data of the set of computing processes. In one example, trusted execution establishment component 310 may include an attestation module 312, an initiation module 314, and a configuration module 316.

Attestation module 312 may enable computing device 110A to perform an attestation to verify the integrity of computing device 110A (e.g., integrity of hardware platform 210, operating system 220, and/or one or more computer processors 214A-C). Attestation may enable a program to check the capabilities of computing device 110A and to detect unauthorized changes to programs, hardware devices, other portions of computing device, or a combination thereof. The unauthorized changes may be the result of malicious, defective, or accidental actions by a program or hardware device. The attestation may involve performing local attestation, remote attestation, or a combination thereof. Local attestation may involve enabling a program executed locally on computing device 110A to verify the integrity of computing device 110A. Remote attestation may involve enabling a program executed remotely on a different computing device (e.g., 110B, 110C) to verify the integrity of computing device 110A. The remote attestation may be performed non-anonymously by disclosing data that uniquely identifies computing device 110A or anonymously without uniquely identifying computing device 110A (e.g., Direct Anonymous Attestation (DAA)). In either example, attestation module 312 may perform one or more attestation operations to determine attestation data 122A-B and may transmit attestation data 122A-B to the programs executing on the local or remote computing devices for verification.

Attestation data 122A-B may be based on the configuration of computing device 110A and may represent the capabilities of the hardware platform, trusted execution environment, executable code, or a combination thereof. Attestation data obtained or generated by the hardware platform (e.g., processor, memory, firmware, BIOS) and be the same or similar to integrity data (e.g., hash or signature of executable code), identification data (e.g., processor model or instance), cryptographic data (e.g., signature keys, endorsement keys, session keys, encryption or decryption keys, authentication keys), measurement data, report data, configuration data, settings data, other data, or a combination thereof. In one example, determining the attestation data may involve attestation chaining in which attestation data of different portions of computing device 110A may be combined before, during, or after being obtained. This may involve determining attestation data for one or more layers of the computing device 110A and the layers may correspond to hardware device layer (e.g., hardware platform attestation data), program layer (e.g, code attestation data), other layer, or a combination thereof.

The program that receives the attestation data may use the attestation data to verify the capabilities of computing device 110A. The program may execute a verification function to verify the computing device 110A in view of the attestation data. The verification function may take as input the attestation data and provide output that indicates whether the computing device 110A is verified (e.g., trusted). In one example, the attestation data may include integrity data (e.g., a message authentication code (MAC)) and the verification function may analyze a portion of attestation data to generate validation data. The verification function may then compare the received integrity data with the generated validation data to perform the attestation (e.g., compare received MAC with generate MAC). In another example, the verification function may take as input data from a different source, such as source code or compiled code and generate validation data that is compared to the received attestation data to determine if the computing device 110A can be trusted to perform a particular set of operations (e.g,. combine keys and execute communal operation), which is discussed in more detail in regards to FIG. 6.

Attestation module 312 may perform operations before, during, or after the trusted execution environment is established on computing device 110A. As discussed in more detail below in regards to FIG. 5-6, attestation module 312 may provide attestation data that is specific to the initiation, configuration, or execution of the trusted execution environment 120. In one example, attestation may involve performing a key exchange between the hardware platform of computing device 110A and a remote computing device (e.g., Diffie-Hellman Key Exchange), establish hardware root of trust, and provide measurement and configuration values of trusted execution environment 120 to the remote computing devices 110B-C.

Initiation module 314 may enable computing device 110A to initiate the configuration of a trusted execution environment before, during, or after the execution of attestation module 312. Initiation module 314 may execute one or more instructions recognized by the processor (e.g., Intel SGX opcodes, AMD SEV opcodes). The instructions may be called by a program associated with an application, kernel, operating system, hypervisor, bootloader, Basic Input Output Services (BIOS), hardware adapter, other entity, or a combination thereof. In one example, a program that will execute in the trusted execution environment may initiate the creation of the trusted execution environment. In another example, a program may initiate the creation of the trusted execution environment and the trusted execution environment may be used for executing another program. In either example, after the trusted execution environment is initiated it may be configured by configuration module 316.

Configuration module 316 may enable computing device 110A to configure a trusted execution environment to store or execute data of a computing process (e.g., application or virtual machine). Configuration module 316 may configure the trusted execution environment in view of configuration data provided by a process initiating or using the trusted execution environment, by a processor, storage device, other portion of computing device 110, or a combination thereof. The configuration data may be provided as input before, during, or after the trusted execution environment is initiated, created, or updated. As discussed above, a trusted execution environment may include a trusted storage area, a trusted processor area, trusted IO, or a combination thereof and the configuration data may include data for configuring one or more of these. For example, configuration data may include an execution construct data (e.g., processes identifier (PID), virtual machine identifier (VMID)), a storage data (e.g., storage size or location), cryptographic data (e.g., encryption key, decryption key, seed, salt, nonce), other data, or a combination thereof. One or more of these may be configured or customize and associated with the trusted execution environment for the computing process. In one example, the trusted execution environment may include an encrypted storage area and the configuration data may indicate a size of the encrypted storage area that will be allocated to store the computing processes (e.g., size of virtual memory for a trusted storage area).

Configuration module 316 may configure different aspects of the trusted execution environment to use different cryptographic techniques. The different cryptographic techniques may use different cryptographic functions, cryptographic settings, cryptographic keys, cryptographic inputs, other cryptographic data, or a combination thereof. In one example, data of a computing process that will be executed by the trusted execution environment 120 may be encrypted using a first cryptographic technique (e.g., encrypted using a location independent transport key) when loaded by the processor and may be encrypted using a second cryptographic technique (e.g., encrypted using a location dependent storage key) when stored in the encrypted storage area. This may be advantageous because the data may be more vulnerable to attack when it is stored on a removable storage device (e.g., memory module) then when it is transferred over the system bus and therefore different cryptographic techniques may be used.

Data component 320 may enable computing device 110A to load data 122 of a computing process into trusted execution environment 120 to enhance the confidentiality and integrity of the data. Data 122 may include protected content 124 (e.g., cryptographic key data), executable code 126 (e.g., machine code, instruction calls, opcodes), non-executable data (e.g., configuration data, parameter values, settings files), other data, or a combination thereof. In one example, data component 320 may include a transfer module 322, a loading module 324, and an execution module 326.

Transfer module 322 may enable computing device 110A to transfer protected content 124 into trusted execution environment 120 and between computing devices without exposing the protected content 124 to processes running external to trusted execution environment 120. Transfer module 322 may transmit protected content 124, received protected content 124, or a combination thereof. In one example, transfer module 322 may transfer protected content 124 to or from an external device (e.g., remote computing device) that is accessible over an external connection (e.g., network, internet, ethernet, or cellular connection) using a network adapter. The network adapter may write the data directly to memory of computing device 110A (e.g., Direct Memory Access (DMA)) or may provide the data to the processor and the processor may write the data to memory. In another example, transfer module 322 may transfer protected data 122 to or from an internal device (e.g., hard drive) that is accessible over an internal connection (e.g., internal data bus). In either example, protected content 124 may be transferred over one or more encrypted communication channels 112A-B.

Encrypted communication channels 112A-B may be security enhanced communication channels that connect trusted execution environment 120 of computing device 110A with a remote computing device. Each of the encrypted communication channels 112A-B may be established by the hardware platform (e.g., processor) and may encrypt the data that is transferred over the encrypted communication channel using hardware based encryption so that the data is accessible to the hardware platform and trusted execution environment 120 without being accessible to any process executed external to the trusted execution environment 120.

As such, when a transfer module 322 sends or receives protected content 124 it may be accessible to the hardware platform of computing device 110A in a decrypted form without being accessible to the operating system of computing device 110A in the decrypted form (i.e., access to encrypted form or no access at all)

Loading module 324 may include instructions for loading data into trusted execution environment 120. Loading data 122 may involve copying data, moving data, updating data, modifying data, or other action affecting data 122. The process of loading data 122 may involve copying data into the trusted processor area from the trusted storage area, copying data into the trusted storage area from an untrusted area, other copy operation, or a combination thereof. Trusted execution environment 120 may store the data of the computing process in the encrypted storage area and the loading may involve the processor receiving the data in an encrypted form over a bus from the encrypted storage area (e.g., retrieving data via trusted IO). The trusted execution environment 120 may include or be associated with a particular portion of memory (e.g., specific range of addresses) and a particular portion of the processor (e.g., particular core) and the data that is loaded into the trusted execution environment 120 may be accessible to the computing process and inaccessible to the kernel prior to the enabling.

Execution module 326 may enable computing device 110A to cause executable code 126 to execute in the trusted execution environment 120. As discussed in regards to FIG. 2, computing device 110A may include an operating system that manages the execution of multiple computing processes. Execution module 326 may be a part of the operating system or interact with the operating system to initiate the execution of executable code 126 as a computing process. Although the operating system may not have access to a decrypted version of the data in trusted execution environment 120, it may be able to manage when the computing process executes and the operations it performs. The operations executed by the executable code 126 in the trusted execution environments are discussed in more detail in regards to FIG. 4-6.

Figure 4:
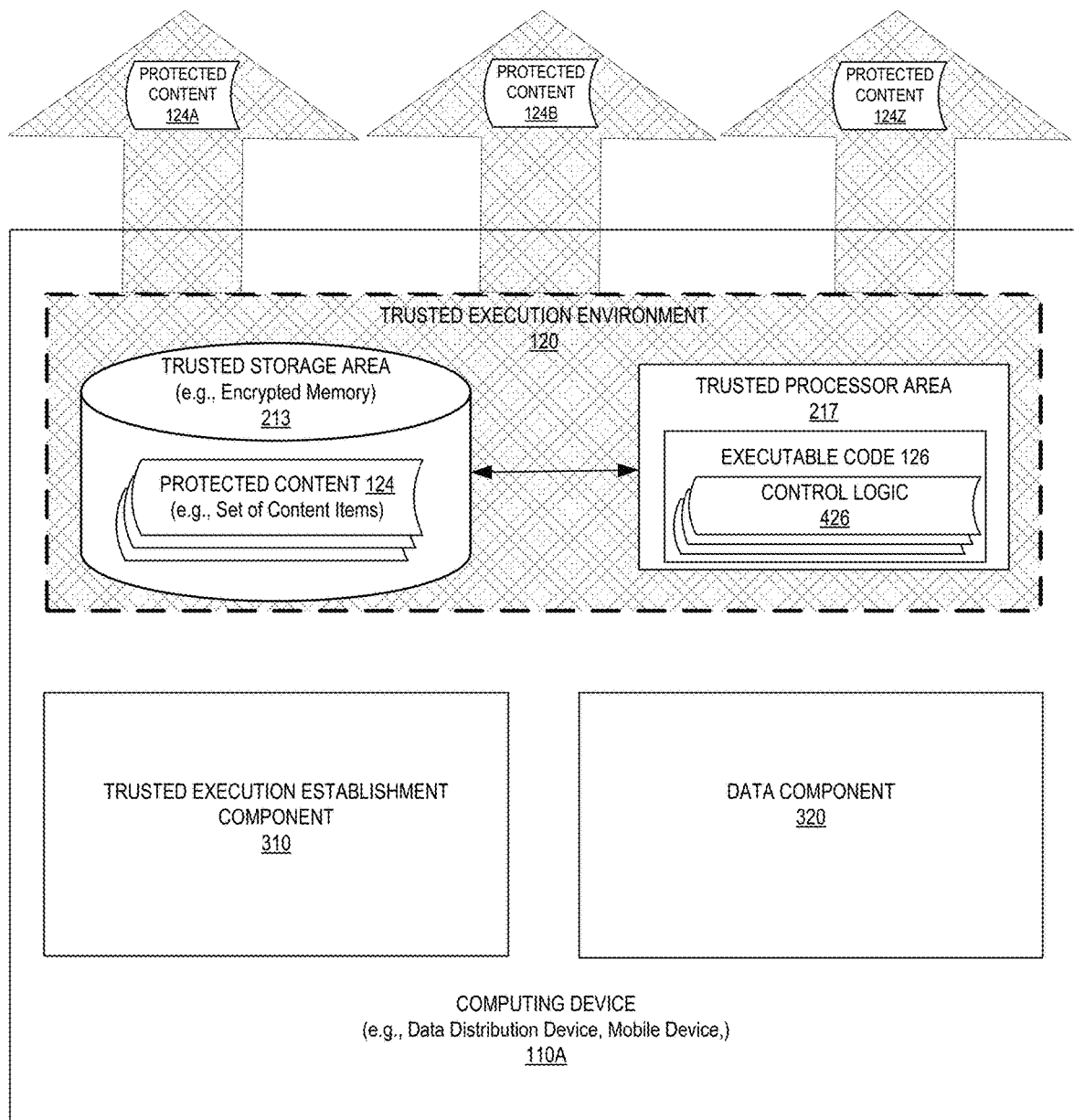
FIG. 4 depicts a block diagram of a computing device that uses a trusted execution environment to distribute protected content to a set of one or more computing devices, in accordance with one or more aspects of the present disclosure.

FIG. 4 depicts a block diagram illustrating an exemplary computing device 110A that is configured to perform data distribution 120, in accordance with one or more aspects of the present disclosure. Computing device 110A may include a trusted execution environment 120 that is loaded with executable code 126 and protected content 124 that may have been received from the same device, which may be referred to as the originating device. The ability of the originating device to provide the executable code 126 may be particularly advantageous because it may enable the originating device to control the manner in which computing device 110A distributes protected content 124 to the set of computing devices. Therefore, the originating computing device can communicate with computing device 110A and control the future operation of computing device 110A without continuously communicating with computing device 110A or having any direct communication with the set of computing devices that will receive portions of protected content 124.

Protected content 124 may be the same or similar to protected content 124 of FIG. 1 and may include a set of one or more content items that are distributed to one or more computing devices. The content items may be distributed from different locations and times or distributed from the same or similar locations and times. In the example shown in FIG. 4, protected content 124 may include protected content 124A (e.g., first content item), protected content 124B (e.g., second content item), and protected content 124C (e.g., third content item). Protected content 124A may be transferred to a first computing device at a first time and location, protected content 124B may be transferred to a second computing device at a second time and location, and protected content 124C may be transferred to a third computing device at a third time and location. There may be any number of content items or computing devices and a particular content item may be sent to more than one computing device and multiple content items may be sent to the same computing device. In one example, protected content 124 may include a set of cryptographic keys (e.g., secret keys, key fragments, key shares) and each of the cryptographic keys of the set may be for a particular computing device in the set. The manner in which protected content 124 is distributed may be determined by executable code 126.

Executable code 126 may include control logic 426 that controls what, when, where, and/or how protected content 124 is distributed by computing device 110A. Executable code 126 may be the same or similar to executable code 126 of FIG. 1 and may include data corresponding to temporal data (e.g., times or durations), location data (e.g., logical or geographic locations), recipient device data (e.g., device or user names), other data, or a combination thereof. Executable code 126 may be executed by trusted execution environment and may implement control logic 426. Control logic 426 may include logic that is common for multiple recipient devices, control logic that is specific to one or more of the recipient devices, or a combination thereof. For example, the control logic executed for one of the recipient devices may be different from the control logic executed for another recipient device. Control logic 426 implemented by executable code 126 may control communication, authentication, or access to protected content 124A-Z.

Controlling communication may involve the executable code 126 requesting, responding, or monitoring communications with recipient devices. The communication with the recipient devices may occur over non-encrypted communication channels, encrypted communication channels, or a combination thereof. In one example, executable code 126 may initiate or register a monitor on computing device 110A that listens for connections to recipient devices and enables the recipient devices to communicate with the computing process executing executable code 126 in the trusted execution environment 120.

Controlling authentication may involve the executable code 126 executing in the trusted execution environment 120 to provide one or more authentication requests, authentications responses, or a combination thereof. The authentication may be based on a single factor authentication or multiple factor authentication. The authentication requests or responses may include authentication data provided to computing device 110A from the recipient device or from the recipient device to computing device 110A. The authentication data may include an identity of the distribution or recipient device (e.g., device ID) or a user of the distribution device (e.g., user ID), or a combination thereof. The authentication data may also or alternatively include particular sensor data (e.g., location), system data (e.g., time), credentials (e.g., account and password), cryptographic key data, questions, answers, tests, proof-of-work tasks, other data, or a combination thereof. Control logic 426 may use or evaluate the authentication data to authenticate the recipient device and provide access to some or all of the protected content 124.

Controlling access may involve the executable code executing in trusted execution environment to provide the set of one or more recipient devices with access to protected content 124. In one example, providing a recipient device with access to a particular portion of protected content (e.g., protected content 124A, 124B, or 124C) may involve the trusted execution environment executing the executable code to transmit the protected content over a communication channel to the recipient device. In another example, providing a recipient device with access to a particular portion of protected content may involve trusted execution environment 120 executing executable code 126 to decrypt and store the protected content in a storage location that is accessible to the recipient device. The storage location may be on computing device 110A, on the recipient device, or on another computing device (e.g., network storage device).

Control logic 426 of executable code 126 may determine an order that protected content 124 is distributed to the recipient devices in the set. The order may be indicated by the data received from the originating device and may be embedded in control logic 426. A violation of the order may result in the control logic 426 performing one or more actions. The actions may include or involve providing a message to the recipient device (e.g., error, warning, or information message), a termination of the code executing in the trusted execution environment, providing invalid data (e.g., duress data, un-decryptable data, null data), other action, or a combination thereof.

Figure 5:
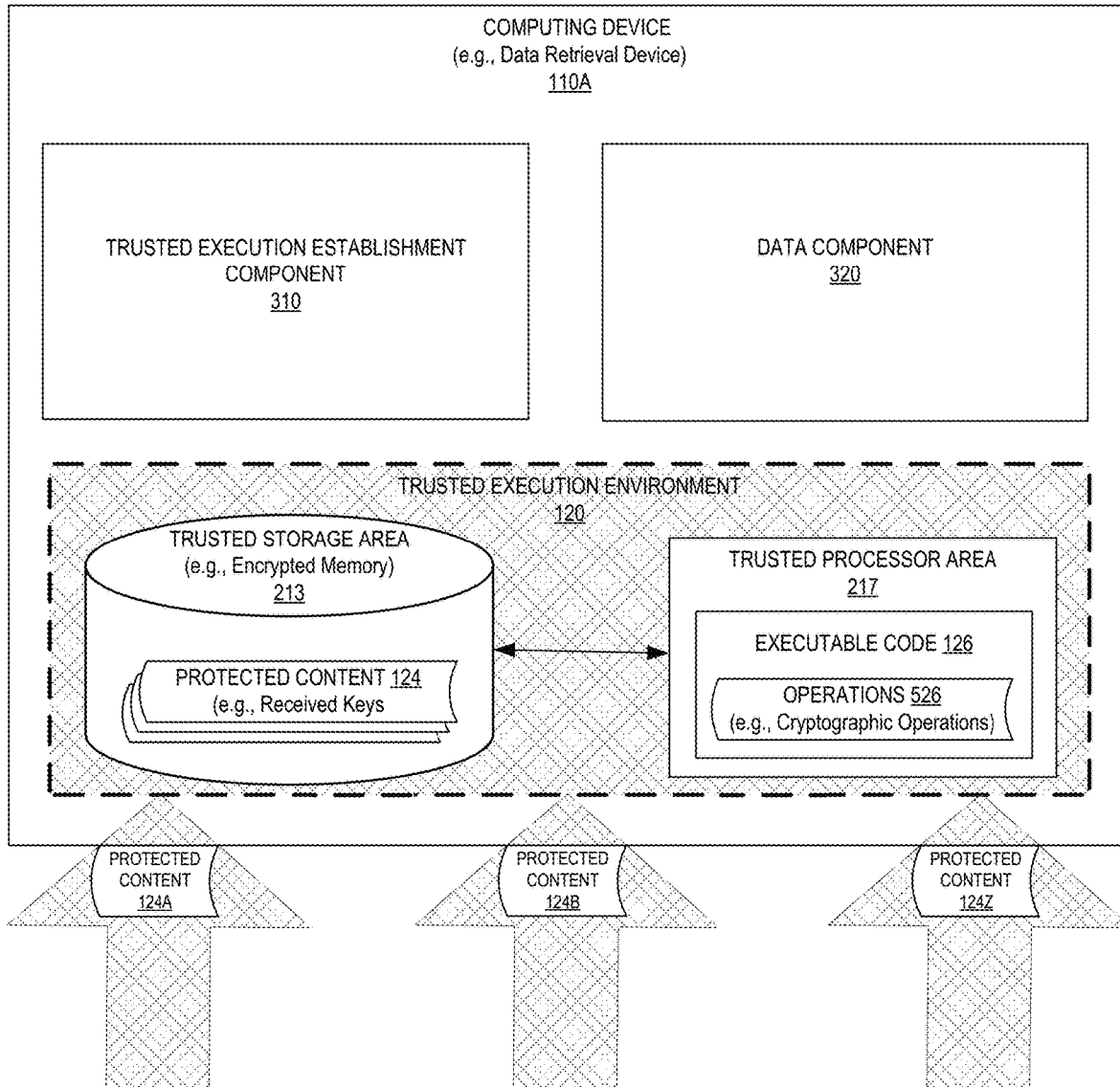
FIG. 5 depicts a block diagram of a computing device that uses a trusted execution environment to retrieve protected content from a set of one or more computing devices, in accordance with one or more aspects of the present disclosure.

FIG. 5 depicts a block diagram illustrating an exemplary computing device 110A that is configured to perform data retrieval 140 to retrieve protected content from a set of one or more computing devices, in accordance with one or more aspects of the present disclosure. The set of computing devices may be referred to as participant devices and they may or may not trust one another and may attempt to keep their protected content hidden from one another. Each of the computing devices may each provide their protected content be stored in the trusted execution environment 120 of computing device 110A and the trusted execution environment 120 may use the protected content to perform an operation. The operation may be a communal operation that requires the protected content from multiple participant devices in order to complete successfully.

The use of the trusted execution environment may be particularly advantageous because the participant devices can each establish a security enhanced connection with the trusted execution environment of computing device 110A and share the protected content with the trusted execution environment without exposing the protected content to any programs running external to the trusted execution environment (e.g., on computing device 110A or the other participant devices). In one example, computing device 110A may be one of the participant devices that provides protected content. In another example, computing device 110A may absent protected content before receiving the protected content from the participant devices. In either example, computing device 110A may establish trusted execution environment 120 to store protected content 124 and to execute executable code 126 that uses protected content 124 to perform one or more operations.

Protected content 124A-Z may be the same or similar to protected content 124A-Z of FIG. 5 and may be provided by the participant devices and stored in trusted execution environment 120 as protected content 124. Each of protected content 124A-Z may include a content item that is transferred to computing device 110 at a different location and time or transferred at the same or similar locations and times. In the example shown in FIG. 5, protected content 124A may be transferred from a first participant device at a first time and location, protected content 124B may be transferred from a second participant device at a second time and location, and protected content 124C may be transferred from a third participant device at a third time and location. There may be any number of protected content items and participant devices. A participant may transfer one or more content items and one or more of the participants may not need to send its protected content item to enable an operation to be performed. In one example, protected content 124A-Z may be a set of cryptographic keys and each of the cryptographic keys in the set may be for a particular participant device (e.g., secret keys, key fragments, key shares).

Executable code 126 may implement one or more operations 526 that use protected content 124. Executable code 126 may be the same or similar to executable code 126 of FIGS. 1 and 4. Operations 526 may involve logic to combine protected content, use protected content, or a combination thereof. Combining protected content may involve accessing protected content 124A-Z from trusted storage area 213 and combining protected content 124A-Z. In one example, the combining may involve appending, concatenating, merging, or adding protected content 124A, 124B, and 124C to generate protected content 124. In another example, the combining may involve initiating one or more cryptographic key functions that may execute internal to trusted execution environment 120, external to trusted execution environment 120, or a combination thereof. The cryptographic key functions may take the protected content as individual inputs or as a combined input.

The cryptographic key functions may be the same or similar to a key generator function (e.g., keygen), a key derivation function (KDF), other cryptographic function, or a combination thereof. In one example, a key generator function may create a single cryptographic key based on one or more key fragments (e.g., protected content 124A-Z) and may or may not include other input data (e.g., key length value, base key, seed value, salt value, nonce value). The key derivation function may involve key strengthening (e.g., key hardening), key stretching (e.g., key lengthening), other key modification, or a combination thereof. The key derivation function may or may not enhance the security of the key or adjust the length of the key to comply with a particular format (e.g., minimum key length). In further examples, cryptographic key function may be a Password-Based Key Derivation Function (e.g., PBKDF1, PBKEDF2) that repeatedly applies a Hash-based Message Authentication Code (HMAC) and one or more salt values to cryptographic input to produce a cryptographic key. The output of the cryptographic key function or combination operation may be accessible to one or more operations 526.

Operations 526 may also or alternatively include an operation that enables computing device 110 to perform an action in view of protected content 124A-Z. The action may involve performing an encryption operation, establishing a connection, performing a transaction, other action, or a combination thereof. The encryption operation may enable computing device 110A to decrypt or encrypt data using protected content 124A-Z. Establishing a connection may enable computing device 110A to establish a communication channel using protected content 124A-Z. The communication channel may be the same or similar to the communication channel 112 of FIG. 1 or encrypted communication channel 112 of FIG. 3 and may enable communication with another device (e.g., data store or computing device). Establishing the communication channel may involve using the cryptographic key to authenticate the computing device by authenticating or authorizing a user, process, device, interface, address, port, socket, other computing structure, or a combination thereof. Establishing the communication channel may also or alternatively involve using the protected content to verify message content received over the communication channel. In one example, protected content 124 may include a session key and the processing device may use the session key to establish a communication channel (e.g., TLS or IPSec connection) for accessing the content. The authentication operation may enable computing device 110A to use protected content 124A-Z to authenticate with one or more other computing devices.

Operations 526 may also or alternatively implement control logic that may control what, when, where, and/or how protected content 124A-Z is retrieved by computing device 110A and may be the same or similar to control logic 426 of FIG. 4. The control logic may include data corresponding to temporal data (e.g., times or durations), location data (e.g., logical or geographic locations), participant device data (e.g., device or user names), other data, or a combination thereof. Control logic may include control logic that is common for multiple participant devices, control logic that is specific to one or more of the participant devices, or a combination thereof. For example, the control logic executed to retrieve protected content from a first participant device may be different from the control logic executed to retrieve protected content from a second participant device. As discussed above, executable code 126 may execute in trusted execution environment 120 and control communication, authentication, and access to protected content 124A-Z of the participant devices (as opposed to recipient devices).

Figure 6:
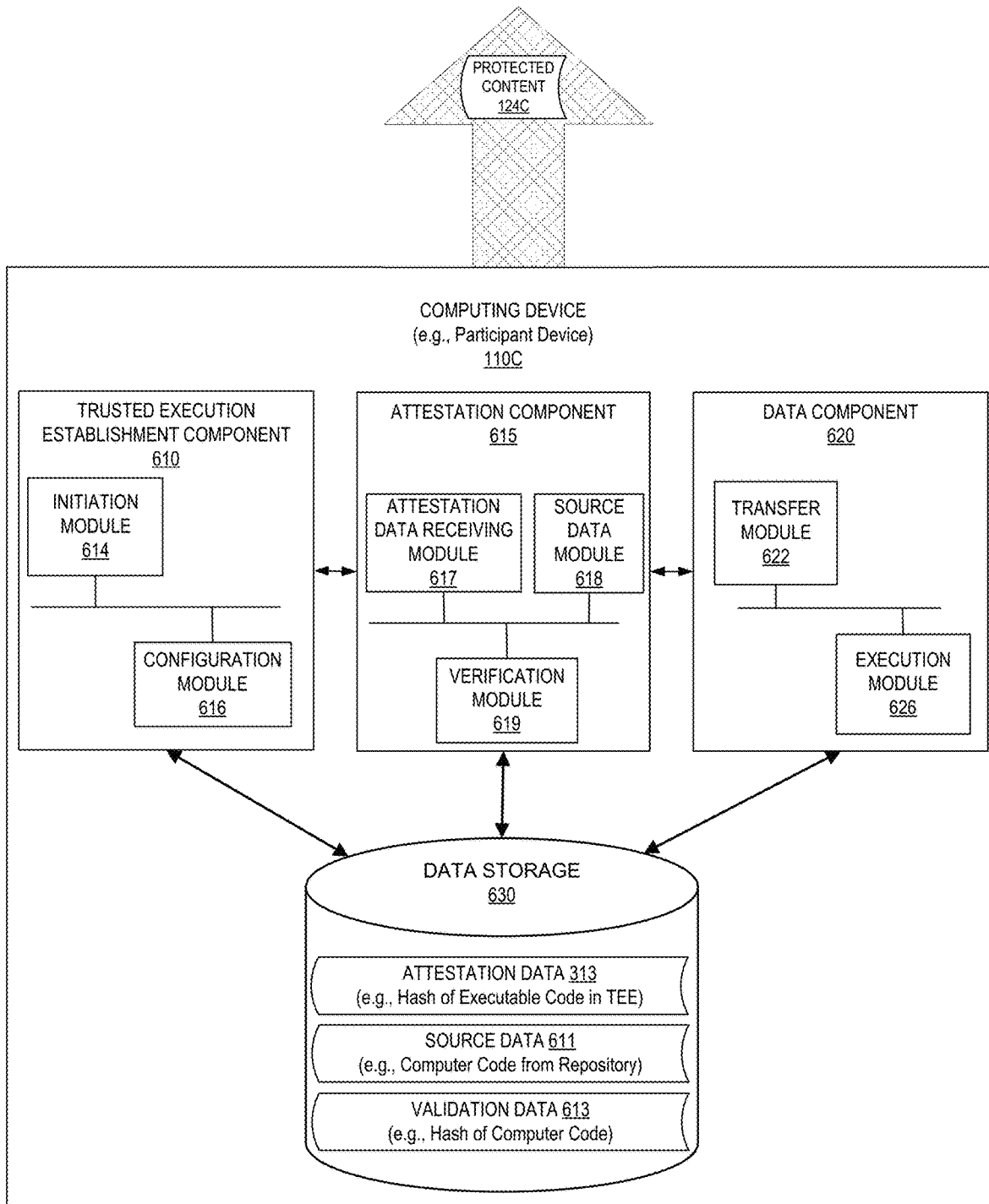
FIG. 6 depicts a block diagram of a computing device that provides protected content to a trusted execution environment of a remote computing device, in accordance with one or more aspects of the present disclosure.

FIG. 6 depicts a block diagram illustrating an exemplary computing device 110C that is configured to function as a participant device and may provide protected content to be stored and used by a trusted execution environment of a remote computing device. The remote computing device may be computing device 110A of FIG. 5 or any other computing device that is separate from computing device 110C and is in communication with computing device 110C via one or more communication channels (e.g., remotely accessible over computer network). The operations performed by computing device 110C may be the same or similar to those performed by a data originating device (e.g., computing device 110B) or another one of the participant devices (computing devices 110D-Z). In one example, computing device 110C may initiate the establishment of the trusted execution environment on the remote computing device, as discussed below in more details. In another example, the trusted execution environment may be initiated by another computing device and established prior to computing device 110C communicating with the remote computing device, as discussed above in regards to FIG. 3. In either example, computing device 110C may not trust the computing device hosting the trusted execution environment and may perform one or more attestation operations. The attestation operations may the same or similar to the attestation operations discussed in regards to FIG. 3 and may be used to verify and validate the executable code that will execute in the trusted execution environment. The attestation operations may be performed before, during, or after providing protected content to the trusted execution environment. In the example shown in FIG. 6, computing device 110C may include a trusted execution establishment component 610, an attestation component 615, and a data component 620.

Trusted execution establishment component 610 may enable a participant device (e.g., computing device 110C) to establish one or more trusted execution environments on a remote computing device (e.g., computing device 110A). Trusted execution establishment component 610 may execute on computing device 110C and may communicate with trusted execution establishment component 310 on computing device 110A. Establishing a trusted execution environment may involve creating a new trusted execution environment or updating an existing trusted execution environment. Each of the one or more trusted execution environments may be associated with a set of one or more computing processes and may store and execute data of the set of computing processes. In one example, trusted execution establishment component 610 may include an initiation module 614 and a configuration module 616.

Initiation module 614 may enable computing device 110C to initiate the configuration of a trusted execution environment before, during, or after the execution of attestation component 615. Initiation module 614 may transfer a request message to the remote computing device. The request message may be an initiated request message or a configuration request message and may be initiated by a program associated with an application, kernel, operating system, hypervisor, bootloader, Basic Input Output Services (BIOS), hardware adapter, other entity, or a combination thereof. The request message transferred to the remote computing device may cause the hardware platform on the remote computing device to execute one or more instructions to establish the trusted execution environment (e.g., Intel SGX opcodes, AMD SEV opcodes). In one example, the hardware platform of the remote computing device may create the trusted execution environment in response to the request message (e.g., initiation request message). In another example, the hardware platform of the remote computing device may have already created a trusted execution environment and may update the trusted execution environment in view of the request message (e.g., configuration request message). In either example, after the trusted execution environment is created it may be configured by configuration module 616.

Configuration module 616 may enable computing device 110A to configure the trusted execution environment on the remote computing device to store or execute data. Configuration module 616 may configure the trusted execution environment by providing the remote computing device with configuration data for the trusted execution environment. The configuration data may be provided as input before, during, or after the trusted execution environment is initiated, created, or updated. As discussed above, a trusted execution environment may include a trusted storage area, a trusted processor area, trusted IO, or a combination thereof and the configuration data may include data for configuring one or more of these. In one example, the trusted execution environment may include an encrypted storage area and the configuration data may indicate a size of the encrypted storage area that will be allocated to store the data (e.g., size of virtual memory for a trusted storage area).

Attestation component 615 may enable a participant device to perform an attestation to verify the remote computing device before, during, or after the trusted execution environment is established on the remote computing device. Attestation may enable a computer program running on computing device 110C to verify the capabilities of a remote computing device and to detect unauthorized changes to programs, hardware devices, or other portions of the remote computing device. The unauthorized changes may be the result of malicious, defective, or accidental actions by a program or hardware device. The attestation may be performed non-anonymously by disclosing data that uniquely identifies the remote computing device or anonymously without uniquely identifying the remote computing device (e.g., Direct Anonymous Attestation (DAA)). In one example, attestation component 615 may include an attestation data receiving module 617, a source data module 618, and a verification module 619.

Attestation data receiving module 617 may enable the participant device to receive attestation data 313 from the remote device that is being verified. Attestation data 313 may be based the configuration of the remote computing device and may represent the capabilities of its hardware platform, trusted execution environment, executable code, or a combination thereof. Attestation data may be received from a program executing on the remote computing device or directly from the hardware platform (e.g., processor, firmware, BIOS) and may be stored in data storage 630 as attestation data 313. Attestation data 313 may be the same or similar to integrity data (e.g., hash or signature of executable code), identification data (e.g., processor model or instance), cryptographic data (e.g., signature keys, endorsement keys, encryption or decryption keys, authentication keys, session keys), measurement data, report data, configuration data, settings data, other data, or a combination thereof. As discussed above, attestation data 313 may be based on attestation data for one or more computing layers of the remote computing device and the computing layers may correspond to a hardware device layer (e.g., hardware platform attestation data), a trusted execution environment layer (e.g., configuration and executable code), operating system layer, other program layer, or a combination thereof. The different layers of attestation data may be combined before, during, or after being received by attestation component 615 and may be referred to as chained attestation data.

Source data module 618 may enable the participant device to use data from an independent source to enhance the security of the attestation process and make it more difficult for the remote computing device to undermine the attestation. The independent source may be any source that is separate from the remote computing device and may be computing device 110C or another computing device. The other computing device may be a device associated with a code repository (e.g., GitHub data storage), a hardware developer (e.g., hardware device designer), a program developer (e.g., operation system designer), certificate authority (e.g., digital certificate service), other third party device or service, or a combination thereof. The independent source may include source data 611 that can be used to validate the attestation data received from the remote computing device.

Source data 611 may be the same or similar to attestation data 313 but may be accessed from the independent source. In one example, source data 611 may include computer code that is related to the executable code in the trusted execution environment of the remote computing device. The computer code may be executable code (e.g., machine readable code), intermediate code (e.g., byte code), source code (e.g., human readable code), other computer code, or a combination thereof. The executable code in the trusted execution environment may be inaccessible to the participant device but the attestation data 313 received from the remote computing device may represent the executable code and may be compared with data generated from the computer code of source data 122 to determine if they match (e.g., compare hashes or digital fingerprints).

Each of the participant devices may have access to the computer code and may analyze the computer code to determine whether the operations performed by the computer code are valid. The analysis may involve inspecting the operations of the computer code using runtime analysis (e.g., analysis while code is executing), static analysis (e.g., analysis while code is not executing), or a combination thereof. In one example, the computer code may be source code (e.g., human readable) and may be inspected before being transformed into executable code. The computer code may or may not be transformed before being used to generate validation data 613. Transforming the computer code may occur before, during, or after the analysis occurs and may involve compiling, linking, building, formatting, or other transformation, from computer code in a first form (e.g., source code) to computer code in a second form (e.g., executable code). The original computer code or the transformed computer code may then be used as input to the verification module 619.

Verification module 619 may enable the participant device to analyze the attestation data in view of the computer code to verify the capabilities of the remote computing device. Verification module 619 may use one or more verification functions that may take as input the attestation data 313 and provide output that indicates whether the remote computing device is verified or unverified. The verification function may generate validation data 613 based on source data 611 (e.g., hash of computer code) and analyze the attestation data 313 in view of the validation data 613 to determine if the executable code in the trusted execution environment of the remote device is valid (e.g., matches the inspected computer code). This may involve comparing a portion of the attestation data 313 and validation data 613 to see if they match (e.g., hash of executable code in TEE matches hash of computer code from repository). If they match, that may indicate the executable code in the TEE is the same as the computer code from the independent source and has not been improperly modified, compromised, or subverted.

Data component 620 may enable the participant device (e.g., computing device 110C) to provide its protected content to the remote computing device in a security enhanced manner to enable the execution of the one or more operations (e.g., communal operations). In one example, data component 620 may include a transfer module 622 and an execution module 626.

Transfer module 622 may enable the participant device to transfer protected content 124C to the remote computing device without exposing protected content 124C to processes running external to the trusted execution environment. Transfer module 622 may transfer protected content 124C to or from an external device (e.g., remote computing device) that is accessible over an external connection (e.g., network, internet, ethernet, or cellular connection) using a network adapter. The network adapter may write the data directly to main memory of computing device 110A (e.g., Direct Memory Access (DMA)) or may provide the data to the processor and the processor may write the data to memory. In another example, transfer module 622 may transfer protected data 124C to or from an internal device (e.g., hard drive) that is accessible over an internal connection (e.g., internal data bus). In either example, protected content 124C may be transferred over one or more encrypted communication channels 112A-B as discussed above in regards to FIG. 3.

Execution module 626 may enable a participant to cause the remote computing device to execute the executable code in the trusted execution environment. As discussed in regards to FIG. 2, the remote computing device (e.g., computing device 110A performing data retrieval 140) may include an operating system that manages the execution of multiple computing processes. In one example, execution module 626 may enable the participant device to send an initiation message that initiates and causes the executable code to execute the operation in the trusted execution environment. In another example, execution module 626 may cause the executable code to execute by providing protected content 124C and the operation (e.g., operation 526) may execute in the trusted execution environment before, during, or after receiving the protected content from multiple participant devices.

FIGS. 7-10 depict flow diagrams for illustrative examples of methods 700, 800, 900, and 1000 for using a trusted execution environment to store protected content during data distribution 120, data retrieval 140, or a combination thereof. Methods 700 and 800 may be performed by a computing devices that are configured to perform data distribution 120 and methods 900 and 1000 may be performed by computing devices that are configured to perform data retrieval 140. Methods 700, 800, 900, and 1000 may be performed by computing devices that comprise hardware (e.g., circuitry, dedicated logic, programmable logic, microcode, etc.), executable code (such as is run on a general purpose computer system or a dedicated machine), or a combination of both. Methods 700, 800, 900, and 1000 and each of their individual functions, routines, subroutines, or operations may be performed by one or more processors of the computing device executing the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 700, 800, 900, and 1000 may be performed by computing device 110A-Z as shown in FIG. 1.

Figure 7:
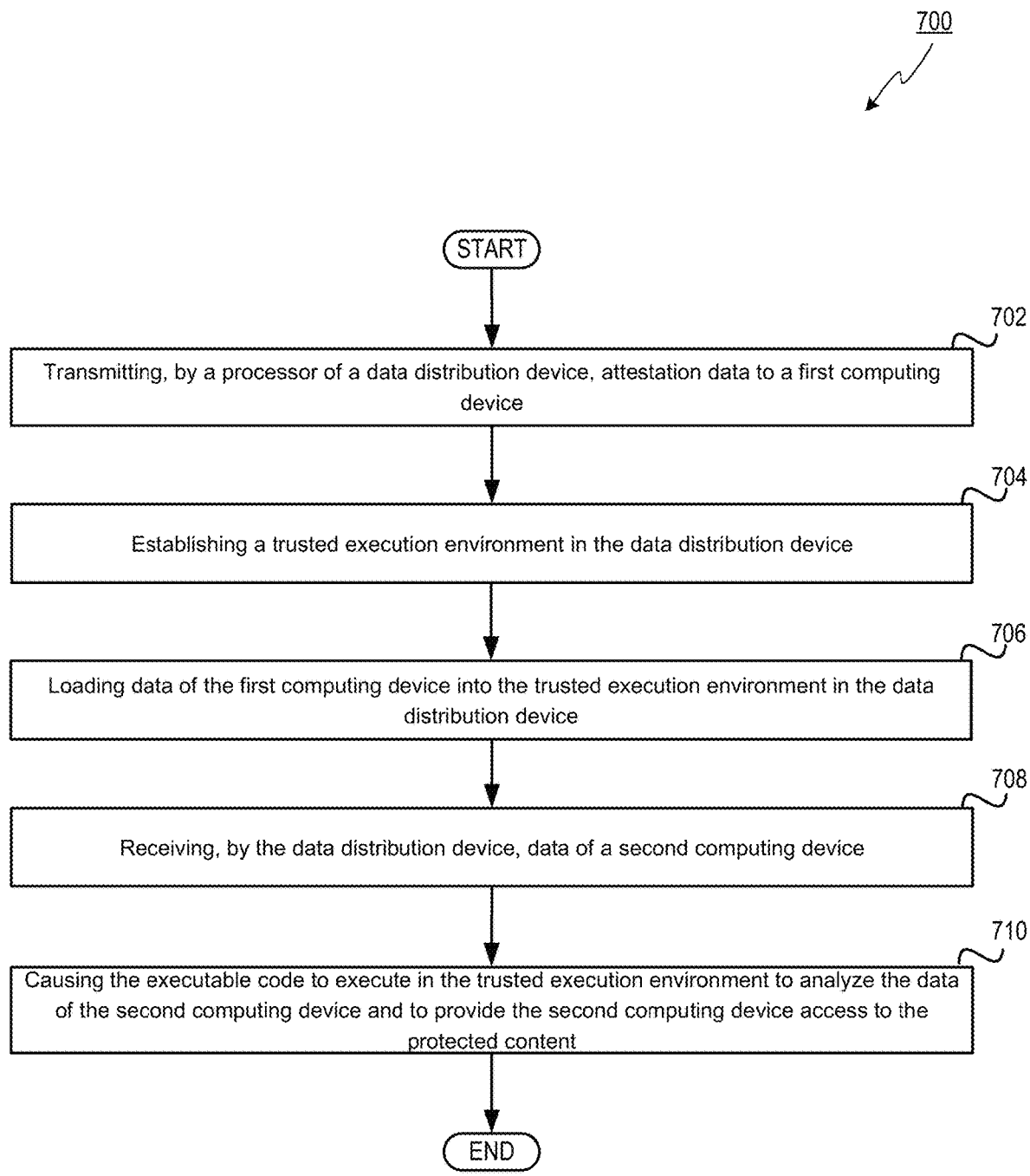
FIG. 7 depicts a flow diagram of a data distribution device that uses a trusted execution environment to distribute protected content to a computing device, in accordance with one or more aspects of the present disclosure.

Referring to FIG. 7, method 700 may be performed by a computing device that is configured to function as a data distribution device to distribute protected content of a first computing device to a second computing device (e.g., recipient device). Method 700 may begin at block 702 where the processor of the data distribution device may transmit attestation data to a first computing device. The attestation data may be based on the configuration of the first computing device and may represent the capabilities of its hardware platform (e.g., processor, firmware), executable code (e.g., code in TEE), or a combination thereof. The attestation data may be the same or similar to integrity data (e.g., hash or signature of executable code), measurement data (processor or storage measurements), report data, configuration data, settings data, identification data (e.g., processor model or instance), cryptographic data (e.g., signature keys, endorsement keys, encryption or decryption keys, authentication keys), other data, or a combination thereof.

At block 704, the processor may establish a trusted execution environment in the data distribution device and the trusted execution environment may include an encrypted storage area. The trusted execution environment in the data distribution device may use the encrypted storage area (e.g., memory encryption) to isolate the data in the trusted execution environment from processes executing external to the trusted execution environment. The processor of the data distribution device may provide the trusted execution environment and the memory encryption using hardware level encryption for the data stored in memory. The hardware level encryption may use cryptographic keys that are accessible to the processor and are inaccessible to all processes executed by the processor. In one example, the processor may receive a request from the first computing device to establish the trusted execution environment and perform a remote attestation of hardware and code of the data distribution device to the first computing device. The process may also configure the encrypted storage area and an area of the processor for the trusted execution environment.

At block 706, the processor of the data distribution device may load data of the first computing device into the trusted execution environment in the data distribution device. The data may include protected content and executable code to control access to the protected content. The protected content may include document data (e.g., secret document), cryptographic key data (e.g., secret key), other data, or a combination thereof that will be distributed by the data distribution device to one or more other computing devices. The processor may receive the data in an encrypted form and may decrypt the data using a first key (e.g., transport key, session key) and encrypt the data before, during, or after storing the data in the encrypted storage area using a second key (e.g., storage key, memory key). The first key may be location independent and the may not be based on the location that the data is stored and the second key may be location dependent and may be based on the location in which the data is stored (e.g., key based on physical or logical memory address).

At block 708, the processor of the data distribution device may receive data of a second computing device. The data of the second computing device may include authentication data and the executable code executing in the trusted execution environment of the data distribution device may include logic to authenticate the second computing device in view of the authentication data. The processor may receive the data of the second computing device (e.g., recipient device) over a communication channel that is different from the communication channel that the data of the first computing device is received from (e.g., communication channel with data originating device). In one example, first computing device may be absent a communication channel with the second computing device and the data distribution device may include a communication channel with the first computing device before the loading and may include a communication channel with the second computing device after the loading.

At block 710, the processor may cause the executable code to execute in the trusted execution environment to analyze the data of the second computing device and to provide the second computing device access to the protected content. In one example, the data distribution device may execute the executable code in the trusted execution environment as one or more application processes, and the executable code in the trusted execution environment may be accessible to the one or more application processes and be inaccessible to a kernel managing the one or more application processes. In another example, the data distribution device may execute the executable code in the trusted execution environment as a virtual machine process and the executable code in the trusted execution environment may be accessible to the virtual machine process and be inaccessible to a hypervisor managing the virtual machine process.

The processor may execute the executable code in the trusted execution environment of the data distribution device to provide the second computing device with access to the protected content. In one example, providing the second computing device access to the protected content may involve the trusted execution environment executing the executable code to transmit the protected content over a communication channel to the second computing device. In another example, providing the second computing device with access to the protected content may involve the trusted execution environment executing the executable code to decrypt and store the protected content in a storage location accessible to the second computing device. The storage location may be on the data distribution device, on the second computing device, on another device, or a combination thereof. Responsive to completing the operations described herein above with references to block 710, the method may terminate.

Figure 8:
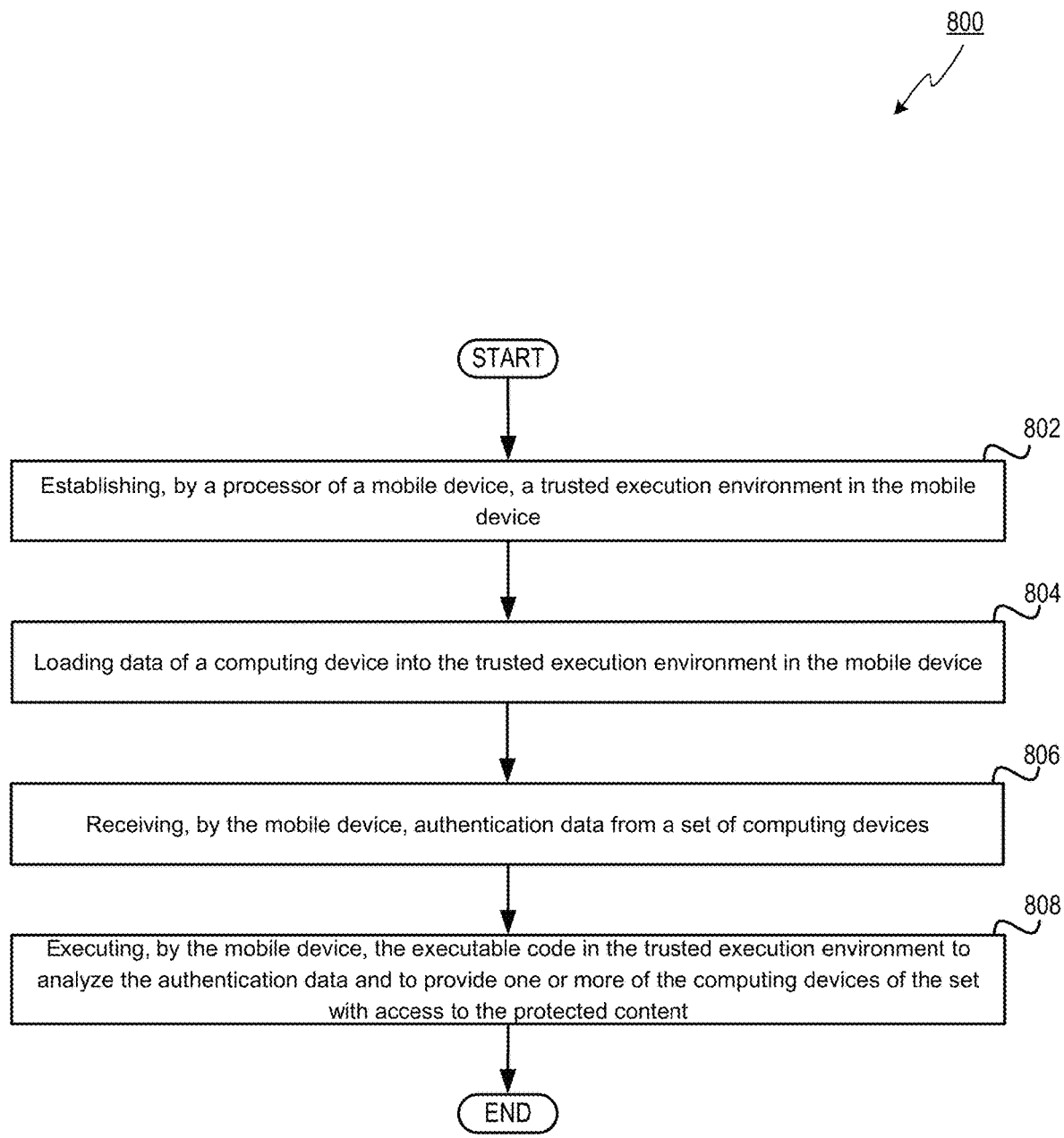
FIG. 8 depicts a flow diagram of a mobile device that uses a trusted execution environment to distribute protected content to computing devices at different locations, in accordance with one or more aspects of the present disclosure.

Referring to FIG. 8, method 800 may be performed by a processor of a mobile device that may be moved between physical or logical locations to distribute protected content to a set of computing devices (e.g., set of recipient devices). Method 800 may begin at block 802 where the processor of the mobile device may establish a trusted execution environment in the mobile device. The trusted execution environment may use an encrypted storage area (e.g., memory encryption) to isolate data in the trusted execution environment from processes executing external to the trusted execution environment. The processor of the mobile device may provide the trusted execution environment and the memory encryption using hardware level encryption for the data stored in memory. The hardware level encryption may use cryptographic keys (e.g., encryption keys, decryption keys) that are accessible to the processor and are inaccessible to all processes executed by the processor.

At block 804, the processor may load data of a computing device into the trusted execution environment in the mobile device. The data may include protected content and include executable code to control access to the protected content. The protected content may be a set of cryptographic keys and the mobile device may function as a key distribution device that distributes the cryptographic keys using the trusted execution environment. In one example, the set may include a cryptographic key for each of the computing devices in the set (e.g., set of decryption keys or endorsement keys). In another example, the set of cryptographic keys may include a set of cryptographic key fragments that are combined to form a single cryptographic key. The executable code that controls access to the protected content may include logic to authenticate one of the computing devices in the set (e.g., participant device) and logic to provide the authenticated computing device with access to the protected content. The executable code that controls access to the protected content may include the same or similar logic for each of the computing devices in the set or may include different logic for each of the computing devices in the set. For example, logic for a first computing device of the set may be different from logic for a second computing device of the set (e.g., different authentication questions may be provided and different responses expected).

At block 806, the processor of the mobile device may receive authentication data from a set of computing devices. The same authentication data or different authentication data may be received from each of the computing devices in the set. In one example, the mobile device may be transported (e.g., carried by third party or self-propelled) after loading the data of the computing device and before receiving the data from one of the computing devices of the set. The original computing device that provided the protected content to the mobile device may be absent a communication channel with any of the computing devices in the set. The mobile device may include a communication channel with the original computing device before the transporting and include a communication channel with each of the computing devices in the set after the transporting.

At block 808, the processor of the mobile device may execute the executable code in the trusted execution environment to analyze the authentication data and to provide one or more of the computing devices of the set with access to the protected content. The executable code that controls access to the protected content may include logic indicating an order to provide the one or more or the computing devices of the set with access to the protected content. In one example, providing the second computing device access to the protected content may involve the trusted execution environment executing the executable code to transmit the protected content over a communication channel to the second computing device. In another example, providing the second computing device with access to the protected content comprises the trusted execution environment executing the executable code to decrypt and store the protected content in a storage location accessible to the second computing device. The storage location may be on the data distribution device, on the second computing device, on another device, or a combination thereof. Responsive to completing the operations described herein above with references to block 808, the method may terminate.

Figure 9:
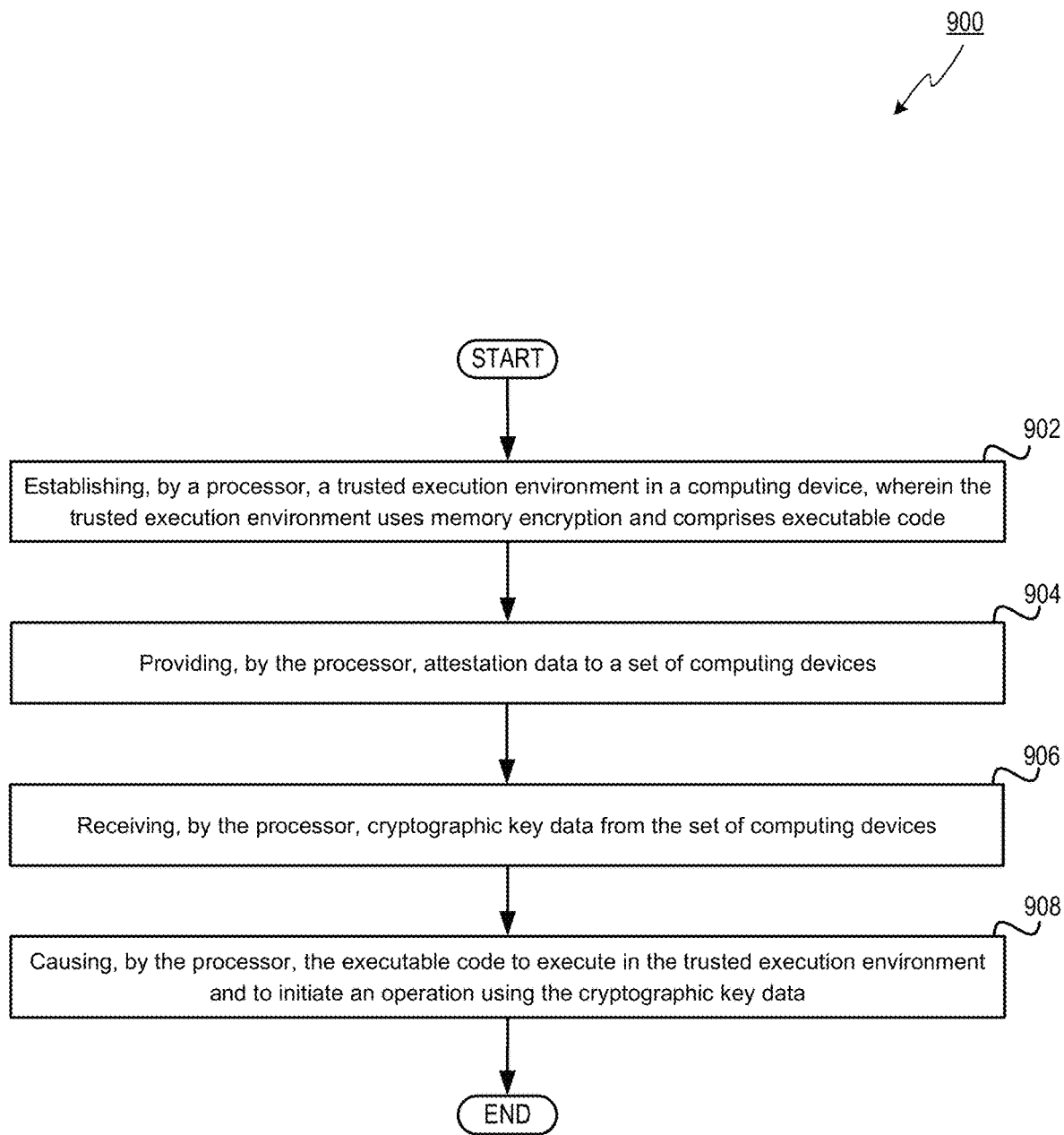
FIG. 9 depicts a flow diagram of a computing device that uses a trusted execution environment to retrieve protected content from a set of one or more participant devices, in accordance with one or more aspects of the present disclosure.

Referring to FIG. 9, method 900 may be performed by a computing device that is configured to function as a data retrieval device to retrieve protected content from a set of one or more computing devices (e.g., a set of participant devices). Method 900 may begin at block 902 where the processor may establish a trusted execution environment in a computing device. The trusted execution environment may use memory encryption to protect the loaded content and comprise executable code to control access to the protected content. The computing device may be physically transported after loading the data of the computing device and before receiving data from the set of computing devices that will receive the protected content. The computing device with the trusted execution environment may include a communication channel with a maximum of one of the computing devices in the set at a time. For example, the computing device may have a communication channel with a first computing device in the set before the transporting and may have a communication channel with a second computing device in the set after the transporting.

At block 904, the processor may provide attestation data to a set of computing devices (e.g., participant devices). The attestation data may represent the executable code and other data in the trusted execution environment. The same attestation data or different attestation data may be provided to each of the computing devices in the set. The attestation data may be provided to a process executed by the processor for performing local attestation or to a process executing on another computing device for performing remote attestation. The received attestation data may be validated via the local attestation, remote attestation, or a combination thereof. The validation may involve inspecting source code associated with the executable code in the trusted execution environment and generating executable code in view of the source code. The processor performing the attestation (e.g., local or remote) may calculate validation data in view of the generated executable code and compare the received attestation data and the generated validation data.

At block 906, the processor may receive cryptographic key data from the set of computing devices. The cryptographic key data may include set of one or more cryptographic keys received over an encrypted or unencrypted communication channel. Receiving the cryptographic key data may involve receiving cryptographic key data (e.g., key, key data item) from each of the computing devices in the set. The cryptographic key data of each computing device may remain hidden from all other computing devices in the set (e.g., plaintext key over encrypted connection or wrapped key over unencrypted connection). In one example, the order in which the processor receives the cryptographic key data from the respective computing devices in the set may be controlled by the executable code. The executable code may enforce a particular order (e.g., computing device 110D after computing device 110C and before computing device 110Z).

At block 908, the processor may cause the executable code to execute in the trusted execution environment and to initiate an operation using the cryptographic key data. The executable code executed in the trusted execution environment may perform the operation and the operation may involve executing a cryptographic function that uses the cryptographic key data. In one example, the cryptographic key data may include a plurality of key fragments, and the executable code executed in the trusted execution environment may combine the key fragments into a single decryption key and provide the single decryption key as input to the operation. In another example, the cryptographic key data may include key shares and the operation may be enabled when a minimum threshold number of cryptographic key shares (e.g., m of n keys) are used to enable operation to execute successfully (3 of 5 keys are received). Responsive to completing the operations described herein above with references to block 908, the method may terminate.

In one example, one or more of the computing devices in the set may select the computing device that will host the trusted execution environment that stores and uses the cryptographic key data. The selection may be an internal selection that selects one of the computing devices in the set (e.g., one of the participants that already has the cryptographic key data) or may be an external selection that selects a computing device that is external to the set (e.g., a mobile device absent any cryptographic key data). The selection may be based on a selection technique that uses configuration data (e.g., device that supports a TEE, performance), identification data (e.g., lowest network address, alphabetical by device name), timing data (e.g., longest running device), other attestation data, or a combination thereof. The selection technique may be rule based, machine learning model based, random (e.g., pseudo-random), consensus based (e.g., consensus election), other selection technique, or a combination thereof.

Figure 10:
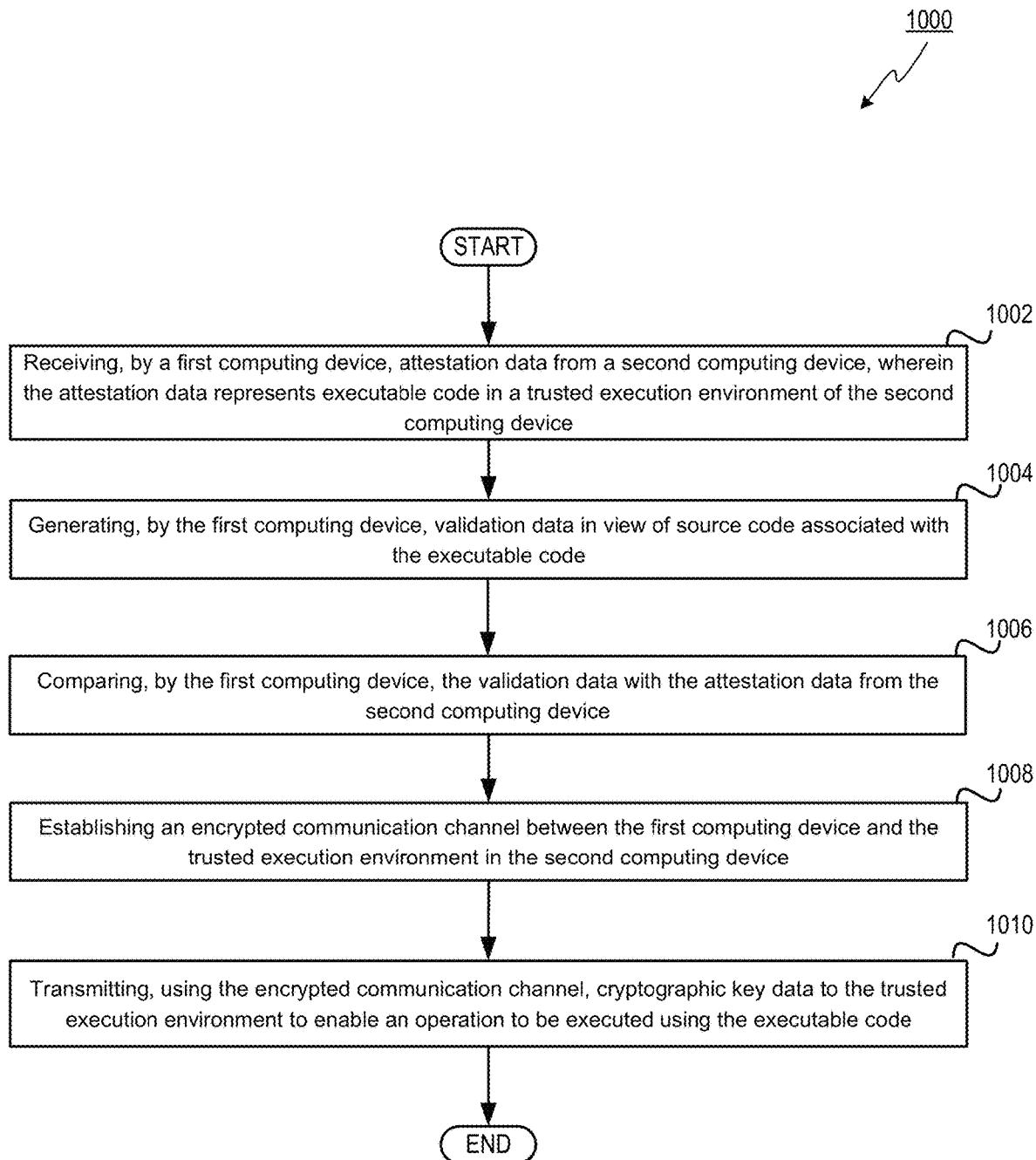
FIG. 10 depicts a flow diagram of a participant device that provides protected content to a trusted execution environment of a remote computing device, in accordance with one or more aspects of the present disclosure.

Referring to FIG. 10, method 1000 may be performed by a computing device that is configured to function as a participant device and provide its protected content (e.g., cryptographic key data) to a data retrieval device to store and use the protected content to perform an operation (e.g., communal operation on behalf of the set of participants). Method 1000 may begin at block 1002 where the processor of a first computing device (e.g., first participant) may receive attestation data from a second computing device (e.g., data retrieval device). The attestation data may represent executable code in a trusted execution environment of the second computing device. The attestation data from the second computing device may include integrity data of the trusted execution environment (e.g., MAC of executable code loaded into the TEE).

At block 1004, the processor of the first computing device may generate validation data in view of source code associated with the executable code. Generating the validation data in view of the source code may involve accessing the source code associated with the executable code that is in the trusted execution environment and determining whether the source code implements valid operations and is absent invalid operations (e.g., no unauthorized operations or modifications). The processor may compile the source code to generate compiled code and hash the compiled code to produce the validation data.

At block 1006, the processor of the first computing device may compare the validation data with the attestation data from the second computing device. The comparison may be performed using one or more verification functions that may take as input the attestation data and provide output that indicates whether the second computing device (e.g., remote data retrieval device) has been verified. The verification function analyze the attestation data in view of the validation data to determine if the executable code in the trusted execution environment of the remote device is valid (e.g., matches with the analyzed source code). This may involve comparing a portion of the attestation data and validation data 122 to see if they match (e.g., hash of TEE executable code matches hash of compiled code). If they match, that may indicate the executable code in the TEE is the same as the compiled code and has not been compromised, subverted, or improperly modified.

At block 1008, the processor of the first computing device may establish an encrypted communication channel between the first computing device and the trusted execution environment in the second computing device. The encrypted communication channel may include a security enhanced communication channel that connects the trusted execution environment of the first computing device with a program executing on the second computing device. The encrypted communication channel may be established by or on behalf of the hardware platform (e.g., processor) and may encrypt the data that is transferred over the encrypted communication channel using hardware based encryption so that the data is accessible to the hardware platform and trusted execution environment 120 without being accessible to any process executed external to the trusted execution environment.

At block 1010, the processor may transmit, using the encrypted communication channel, the cryptographic key data to the trusted execution environment to enable an operation to be executed using the executable code. The cryptographic key data and the executable code may be inaccessible to an operating system of the second computing device. The operation executed in the trusted execution environment of the second computing device may be a cryptographic operation that uses the cryptographic key data. In one example, transmitting the cryptographic key data may involve transmitting a cryptographic key fragment, and the operation may be an operation that combines the cryptographic key fragment with key fragments from one or more other computing devices in the set to enable the operation to complete successfully (e.g., decrypt data, authorize a transaction). In another example, the cryptographic key data may include one or more key shares and use of a minimum threshold number of cryptographic key shares may enable the operation to execute successfully (e.g., operation successful if at least 3 of 5 participants provide their cryptographic keys). Responsive to completing the operations described herein above with references to block 1010, the method may terminate.

Figure 11:
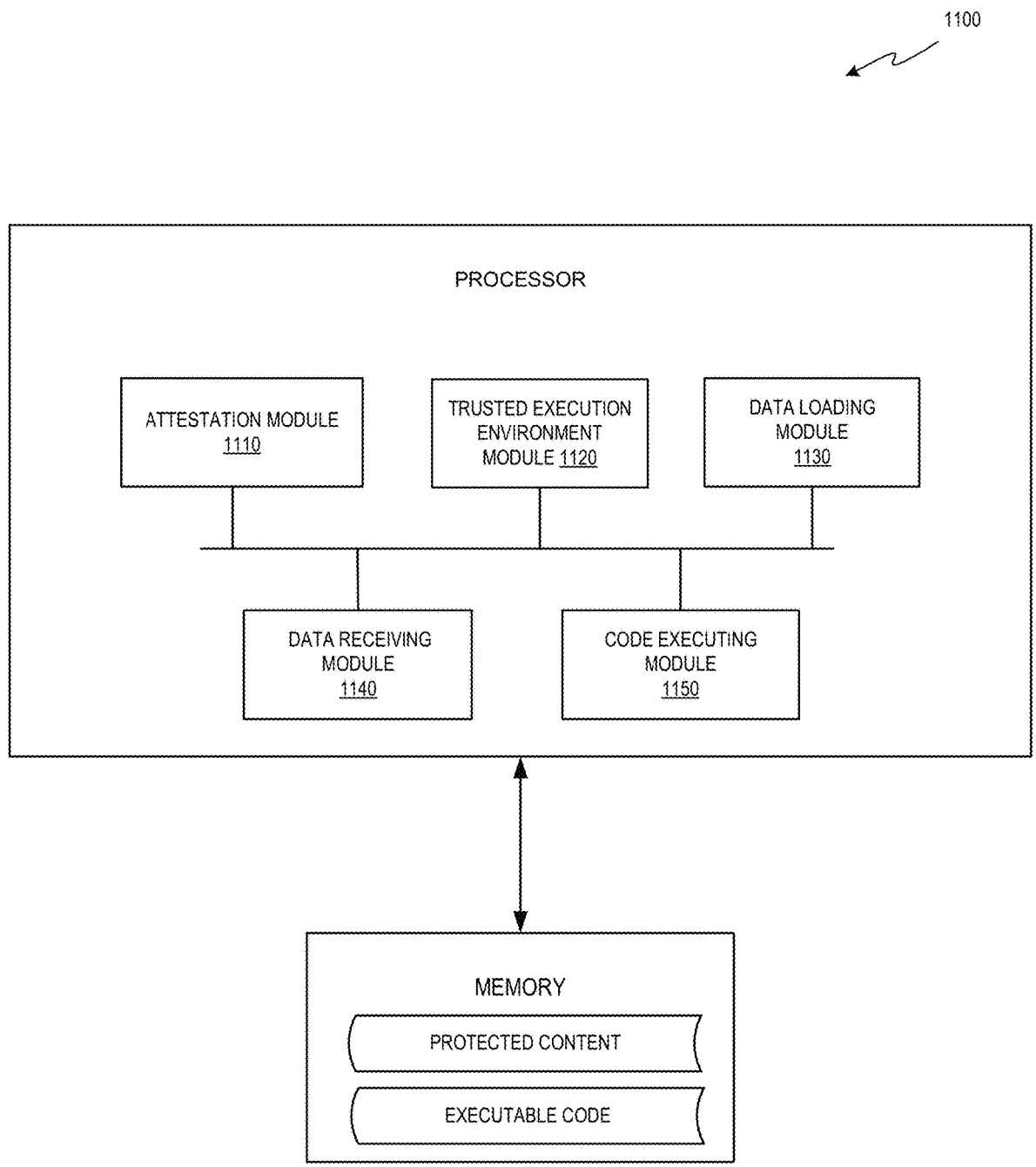
FIG. 11 depicts a block diagram of an example computing system in accordance with one or more aspects of the present disclosure.

FIG. 11 depicts a block diagram of a computer system 1100 operating in accordance with one or more aspects of the present disclosure. Computer system 1100 may be the same or similar to computing device 110A of FIGS. 1-5, and may include one or more processors and one or more memory devices. In the example shown, computer system 1100 may include an attestation module 1110, a trusted execution environment module 1120, data loading module 1130, a data receiving module 1140, and a code executing module 1150.

Attestation module 1110 may enable a processor of the data distribution device to transmit attestation data to a first computing device. The attestation data may be based on the configuration of the first computing device and may represent the capabilities of its hardware platform (e.g., processor, firmware), executable code (e.g., code in TEE), or a combination thereof. The attestation data may be the same or similar to integrity data (e.g., hash or signature of executable code), measurement data (processor or storage measurements), report data, configuration data, settings data, identification data (e.g., processor model or instance), cryptographic data (e.g., signature keys, endorsement keys, encryption or decryption keys, authentication keys), other data, or a combination thereof.

Trusted execution environment module 1120 may enable the processor to establish a trusted execution environment in the data distribution device and the trusted execution environment may include an encrypted storage area. The trusted execution environment in the data distribution device may use the encrypted storage area (e.g., memory encryption) to isolate the data in the trusted execution environment from processes executing external to the trusted execution environment. The processor of the data distribution device may provide the trusted execution environment and the memory encryption using hardware level encryption for the data stored in memory. The hardware level encryption may use cryptographic keys that are accessible to the processor and are inaccessible to all processes executed by the processor. In one example, the processor may receive a request from the first computing device to establish the trusted execution environment and perform a remote attestation of hardware and code of the data distribution device to the first computing device. The process may also configure the encrypted storage area and an area of the processor for the trusted execution environment.

Data loading module 1130 may enable the processor of the data distribution device to load data of the first computing device into the trusted execution environment in the data distribution device. The data may include protected content and executable code to control access to the protected content. The protected content may include document data (e.g., secret document), cryptographic key data (e.g., secret key), other data, or a combination thereof that will be distributed by the data distribution device to one or more other computing devices. The processor may receive the data in an encrypted form and may decrypt the data using a first key (e.g., transport key, session key) and encrypt the data before, during, or after storing the data in the encrypted storage area using a second key (e.g., storage key, memory key). The first key may be location independent and the may not be based on the location that the data is stored and the second key may be location dependent and may be based on the location in which the data is stored (e.g., key based on physical or logical memory address).

Data receiving module 1140 may enable the processor of the data distribution device to receive data of a second computing device. The data of the second computing device may include authentication data and the executable code executing in the trusted execution environment of the data distribution device may include logic to authenticate the second computing device in view of the authentication data. The processor may receive the data of the second computing device (e.g., recipient device) over a communication channel that is different from the communication channel that the data of the first computing device is received from (e.g., communication channel with data originating device). In one example, first computing device may be absent a communication channel with the second computing device and the data distribution device may include a communication channel with the first computing device before the loading and may include a communication channel with the second computing device after the loading.

Code executing module 1150 may enable the processor to cause the executable code to execute in the trusted execution environment to analyze the data of the second computing device and to provide the second computing device access to the protected content. In one example, the data distribution device may execute the executable code in the trusted execution environment as one or more application processes, and the executable code in the trusted execution environment may be accessible to the one or more application processes and be inaccessible to a kernel managing the one or more application processes. In another example, the data distribution device may execute the executable code in the trusted execution environment as a virtual machine process and the executable code in the trusted execution environment may be accessible to the virtual machine process and be inaccessible to a hypervisor managing the virtual machine process.

The processor may execute the executable code in the trusted execution environment of the data distribution device to provide the second computing device with access to the protected content. In one example, providing the second computing device access to the protected content may involve the trusted execution environment executing the executable code to transmit the protected content over a communication channel to the second computing device. In another example, providing the second computing device with access to the protected content may involve the trusted execution environment executing the executable code to decrypt and store the protected content in a storage location accessible to the second computing device. The storage location may be on the data distribution device, on the second computing device, on another device, or a combination thereof.

Figure 12:
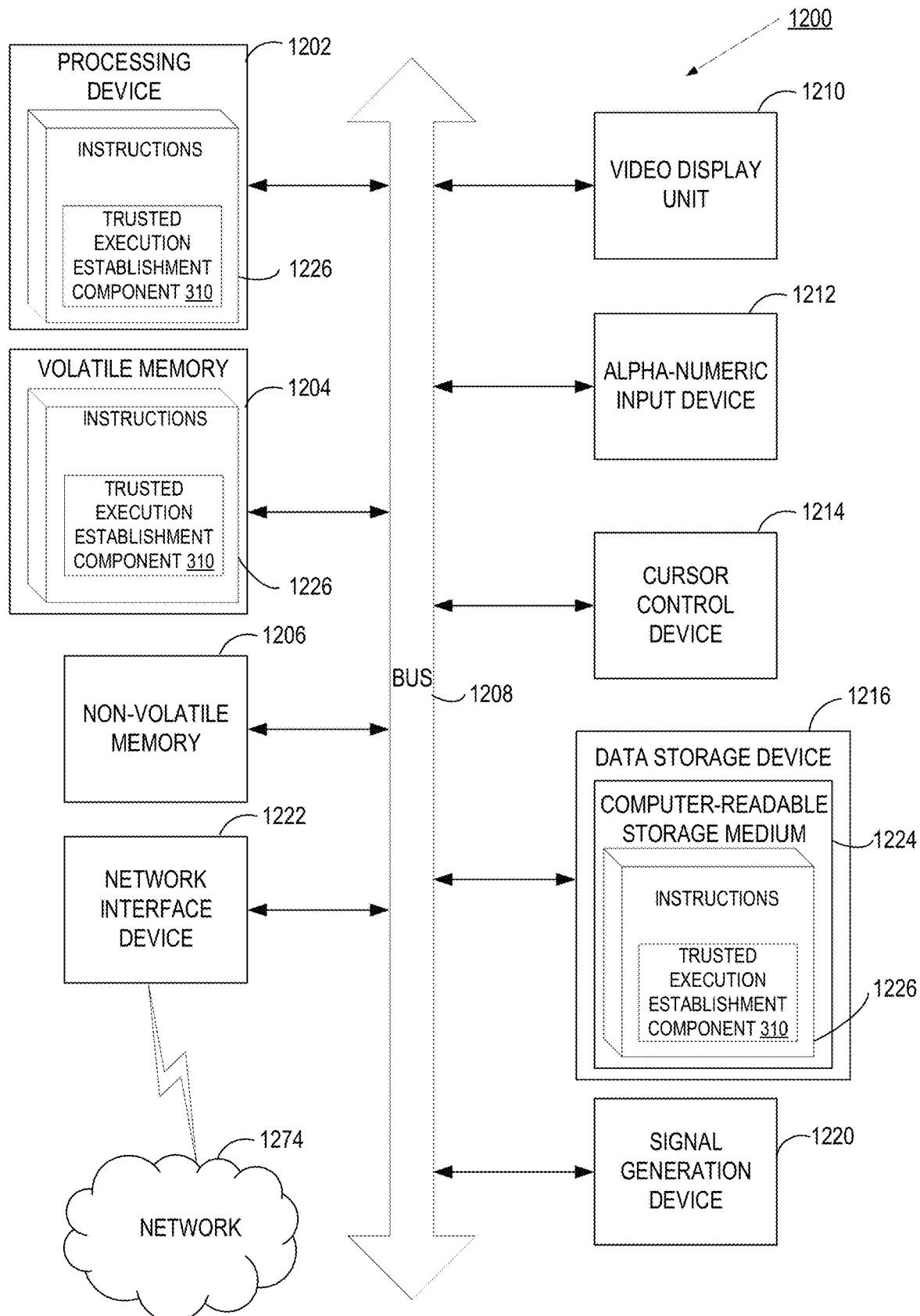
FIG. 12 depicts a block diagram of another example computing device operating in accordance with the examples of the present disclosure.

FIG. 12 depicts a block diagram of a computer system operating in accordance with one or more aspects of the present disclosure. In various illustrative examples, computer system 1200 may correspond to computing device 110A-Z. Computer system 1200 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 1200 may be connected (e.g., via a network, such as a Local Area Network (LAN), an intranet, an extranet, or the Internet) to other computer systems. Computer system 1200 may operate in the capacity of a server or a client computer in a client-server environment, or as a peer computer in a peer-to-peer or distributed network environment. Computer system 1200 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1200 may include a processing device 1202, a volatile memory 1204 (e.g., random access memory (RAM)), a non-volatile memory 1206 (e.g., read-only memory (ROM) or electrically-erasable programmable ROM (EEPROM)), and a data storage device 1216, which may communicate with each other via a bus 1208.

Processing device 1202 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1200 may further include a network interface device 1222.

Computer system 1200 also may include a video display unit 1210 (e.g., an LCD), an alphanumeric input device 1212 (e.g., a keyboard), a cursor control device 1214 (e.g., a mouse), and a signal generation device 1220.

Data storage device 1216 may include a non-transitory computer-readable storage medium 1224 on which may store instructions 1226 encoding any one or more of the methods or functions described herein, including instructions for implementing method 700, 800, 900, 1000, and for encoding components 310 and 310 of FIG. 3.

Instructions 1226 may also reside, completely or partially, within volatile memory 1204 and/or within processing device 1202 during execution thereof by computer system 1200, hence, volatile memory 1204 and processing device 1202 may also constitute machine-readable storage media.

While computer-readable storage medium 1224 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "loading," "causing," "performing," "executing," "configuring," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements (e.g., cardinal meaning) and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 700, 800, 900, or 1000 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   establishing a trusted execution environment in a data distribution device to transfer protected content between a first computing device and a second computing device, wherein the trusted execution environment comprises an encrypted storage area, and wherein the data distribution device is in communication with the first computing device in a first geographic location;
   loading data of the first computing device into the trusted execution environment in the data distribution device, wherein the data of the first computing device comprises the protected content and comprises executable code to control access to the protected content by the second computing device;
   receiving, by the data distribution device, data of the second computing device, wherein the data distribution device is moved from the first geographic location to a second geographic location to communicate with the second computing device; and
   causing the executable code to execute in the trusted execution environment to analyze the data of the second computing device and to provide the second computing device access to the protected content.

2. The method of claim 1, wherein the trusted execution environment in the data distribution device uses memory encryption to isolate the data in the trusted execution environment from processes executing external to the trusted execution environment.

3. The method of claim 1, wherein the processor of the data distribution device provides the trusted execution environment using hardware level encryption for the data in memory, wherein the hardware level encryption uses cryptographic keys that are accessible to the processor and are inaccessible to all processes executed by the processor.

4. The method of claim 1, wherein the data distribution device executes the executable code in the trusted execution environment as one or more application processes, and wherein the executable code in the trusted execution environment is accessible to the one or more application processes and is inaccessible to a kernel managing the one or more application processes.

5. The method of claim 1, wherein the data distribution device executes the executable code in the trusted execution environment as a virtual machine process, and wherein the executable code in the trusted execution environment is accessible to the virtual machine process and is inaccessible to a hypervisor managing the virtual machine process.

6. The method of claim 1, further comprising:
   receiving, by the processor of the data distribution device, a request from the first computing device to establish the trusted execution environment in the data distribution device;
   performing, by the processor, a remote attestation of hardware and code of the data distribution device to the first computing device; and
   configuring, by the processor, the encrypted storage area and an area of the processor for the trusted execution environment.

7. The method of claim 1, wherein the data of the second computing device comprises authentication data and wherein the executable code executing in the trusted execution environment of the data distribution device comprises logic to authenticate the second computing device in view of the authentication data.

8. The method of claim 1, wherein the data distribution device comprises a communication channel with the first computing device before the loading and comprises a communication channel with the second computing device after the loading, and wherein the first computing device is absent a communication channel with the second computing device.

9. The method of claim 1, wherein providing the second computing device access to the protected content comprises the trusted execution environment executing the executable code to transmit the protected content over a communication channel to the second computing device.

10. The method of claim 1, wherein providing the second computing device with access to the protected content comprises the trusted execution environment executing the executable code to decrypt and store the protected content in a storage location accessible to the second computing device.

11. A system comprising:
   a memory; and
   a processor communicably coupled to the memory, the processor to:
      establish a trusted execution environment in a data distribution device to transfer protected content between a first computing device and a second computing device, wherein the trusted execution environment comprises an encrypted storage area, and wherein the data distribution device is in communication with the first computing device in a first geographic location;
      load data of the first computing device into the trusted execution environment, wherein the data of the first computing device comprises the protected content and comprises executable code to control access to the protected content by the second computing device;
      receive data of the second computing device, wherein the data distribution device is moved from the first geographic location to a second geographic location to communicate with the second computing device; and
      cause the executable code to execute in the trusted execution environment to analyze the data of the second computing device and to provide the second computing device access to the protected content.

12. The system of claim 11, wherein the trusted execution environment uses memory encryption to isolate the data in the trusted execution environment from processes executing external to the trusted execution environment.

13. The system of claim 11, wherein the processor provides the trusted execution environment using hardware level encryption for the data in memory, wherein the hardware level encryption uses cryptographic keys that are accessible to the processor and are inaccessible to all processes executed by the processor.

14. The system of claim 11, wherein the trusted execution environment executes the executable code as one or more application processes, and wherein the executable code in the trusted execution environment is accessible to the one or more application processes and is inaccessible to a kernel managing the one or more application processes.

15. The system of claim 11, wherein the trusted execution environment executes the executable code as a virtual machine process, and wherein the executable code in the trusted execution environment is accessible to the virtual machine process and is inaccessible to a hypervisor managing the virtual machine process.

16. A non-transitory machine-readable storage medium storing instructions which, when executed, cause a processor of a first computing device to perform operations comprising:
   establishing a trusted execution environment in a data distribution device to transfer protected content between a first computing device and a second computing device, wherein the trusted execution environment comprises an encrypted storage area, and wherein the data distribution device is in communication with the first computing device in a first geographic location;
   loading data of the first computing device into the trusted execution environment in the data distribution device, wherein the data of the first computing device comprises the protected content and comprises executable code to control access to the protected content by the second computing device;
   receiving, by the data distribution device, data of the second computing device, wherein the data distribution device is moved from the first geographic location to a second geographic location to communicate with the second computing device; and
   causing the executable code to execute in the trusted execution environment to analyze the data of the second computing device and to provide the second computing device access to the protected content.

17. The non-transitory machine-readable storage medium of claim 16, wherein the trusted execution environment in the data distribution device uses memory encryption to isolate the data in the trusted execution environment from processes executing external to the trusted execution environment.

18. The non-transitory machine-readable storage medium of claim 16, wherein the processor of the data distribution device provides the trusted execution environment using hardware level encryption for the data in memory, wherein the hardware level encryption uses cryptographic keys that are accessible to the processor and are inaccessible to all processes executed by the processor.

19. The non-transitory machine-readable storage medium of claim 16, wherein the data distribution device executes the executable code in the trusted execution environment as one or more application processes, and wherein the executable code in the trusted execution environment is accessible to the one or more application processes and is inaccessible to a kernel managing the one or more application processes.

20. The non-transitory machine-readable storage medium of claim 16, wherein the data distribution device executes the executable code in the trusted execution environment as a virtual machine process, and wherein the executable code in the trusted execution environment is accessible to the virtual machine process and is inaccessible to a hypervisor managing the virtual machine process.

* * * * *